United States Patent
Ohki et al.

(10) Patent No.: US 10,094,422 B2
(45) Date of Patent: Oct. 9, 2018

(54) BEARING COMPONENT AND ROLLING BEARING

(71) Applicant: NTN CORPORATION, Osaka (JP)

(72) Inventors: Chikara Ohki, Kuwana (JP); Yukio Matsubara, Kuwana (JP); Daisuke Sato, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/895,901

(22) PCT Filed: May 28, 2014

(86) PCT No.: PCT/JP2014/064113
§ 371 (c)(1),
(2) Date: Dec. 3, 2015

(87) PCT Pub. No.: WO2014/196428
PCT Pub. Date: Dec. 11, 2014

(65) Prior Publication Data
US 2016/0123396 A1 May 5, 2016

(30) Foreign Application Priority Data

Jun. 6, 2013 (JP) .................................. 2013-120143
Jun. 6, 2013 (JP) .................................. 2013-120144

(51) Int. Cl.
*F16C 33/62* (2006.01)
*C21D 9/40* (2006.01)
(Continued)

(52) U.S. Cl.
CPC ................ *F16C 33/62* (2013.01); *C21D 9/38* (2013.01); *C21D 9/40* (2013.01); *C22C 38/00* (2013.01);
(Continued)

(58) Field of Classification Search
USPC .......................... 384/492; 428/325, 469, 698
See application file for complete search history.

(56) References Cited

U.S. PATENT DOCUMENTS 4,650,195 A 3/1987 Dreschmann et al.
5,228,377 A 7/1993 Watanabe
(Continued)

FOREIGN PATENT DOCUMENTS

CN 1421541 A 6/2003
CN 1534212 A 10/2004
(Continued)

OTHER PUBLICATIONS

Patent Family from the European Patent Office online services generated on Jun. 27, 2018.*
(Continued)

*Primary Examiner* — Archene A Turner
(74) *Attorney, Agent, or Firm* — McDermott Will & Emery LLP

(57) ABSTRACT

A bearing component composed of steel which contains carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and is composed of remainder iron and an impurity and having a carbonitrided layer formed at a surface portion is provided. An average concentration of nitrogen in the surface portion is not lower than 0.3 mass % and not higher than 0.6 mass % and variation in nitrogen concentration is not higher than 0.1 mass %. An amount of retained austenite is not greater than 8 volume %. An area ratio of a precipitate in the inside where no carbonitrided layer is formed is not lower than 11%.

9 Claims, 24 Drawing Sheets

(51) Int. Cl.

| | | |
|---|---|---|
| *C23C 8/32* | (2006.01) | |
| *C22C 38/00* | (2006.01) | |
| *C22C 38/18* | (2006.01) | |
| *F16C 33/32* | (2006.01) | |
| *F16C 33/34* | (2006.01) | |
| *C22C 38/02* | (2006.01) | |
| *C22C 38/04* | (2006.01) | |
| *C22C 38/20* | (2006.01) | |
| *C22C 38/22* | (2006.01) | |
| *C22C 38/42* | (2006.01) | |
| *C22C 38/44* | (2006.01) | |
| *C21D 9/38* | (2006.01) | |
| *C21D 1/76* | (2006.01) | |
| *C21D 1/06* | (2006.01) | |

(52) U.S. Cl.
CPC ............ *C22C 38/002* (2013.01); *C22C 38/02* (2013.01); *C22C 38/04* (2013.01); *C22C 38/18* (2013.01); *C22C 38/20* (2013.01); *C22C 38/22* (2013.01); *C22C 38/42* (2013.01); *C22C 38/44* (2013.01); *C23C 8/32* (2013.01); *F16C 33/32* (2013.01); *F16C 33/34* (2013.01); *C21D 1/06* (2013.01); *C21D 1/76* (2013.01); *C21D 2211/004* (2013.01); *F16C 2204/64* (2013.01); *F16C 2204/70* (2013.01); *F16C 2223/16* (2013.01)

(56) References Cited

U.S. PATENT DOCUMENTS

| | | | |
|---|---|---|---|
| 5,338,377 | A | 8/1994 | Mitamura et al. |
| 5,626,974 | A | 5/1997 | Mitamura |
| 6,082,906 | A | 7/2000 | Satou et al. |
| 6,770,152 | B1 | 8/2004 | Okita et al. |
| 7,641,742 | B2 | 1/2010 | Ohki et al. |
| 8,088,230 | B2 | 1/2012 | Ueda et al. |
| 2002/0066502 | A1 | 6/2002 | Tako et al. |
| 2002/0082133 | A1 | 6/2002 | Yoshikawa et al. |
| 2003/0123769 | A1 | 7/2003 | Ohki |
| 2004/0047528 | A1 | 3/2004 | Tsujimoto et al. |
| 2004/0170348 | A1 | 9/2004 | Okugami et al. |
| 2004/0190808 | A1 | 9/2004 | Maeda et al. |
| 2005/0045247 | A1 | 3/2005 | Ohki |
| 2005/0092396 | A1 | 5/2005 | Takemura et al. |
| 2005/0141799 | A1 | 6/2005 | Uyama et al. |
| 2005/0205163 | A1 | 9/2005 | Ohki |
| 2006/0204155 | A1 | 9/2006 | Watanabe et al. |
| 2006/0266440 | A1 | 11/2006 | Tanaka et al. |
| 2007/0034301 | A1 | 2/2007 | Hasegawa et al. |
| 2007/0151633 | A1 | 7/2007 | Ohki et al. |
| 2007/0169850 | A1 | 7/2007 | Ohki et al. |
| 2007/0269336 | A1 | 11/2007 | Ohki et al. |
| 2009/0038713 | A1 | 2/2009 | Ueda et al. |
| 2010/0154937 | A1 | 6/2010 | Ohki |
| 2011/0000583 | A1 | 1/2011 | Kizawa et al. |
| 2012/0014635 | A1 | 1/2012 | Ohki et al. |
| 2012/0051680 | A1 | 3/2012 | Ishikawa et al. |
| 2012/0051682 | A1 | 3/2012 | Ohki |
| 2012/0060634 | A1 | 3/2012 | Ueno |
| 2013/0019666 | A1 | 1/2013 | Ohki |
| 2014/0348454 | A1 | 11/2014 | Ueno et al. |
| 2015/0377293 | A1* | 12/2015 | Sakanaka ................. C21D 9/40 384/492 |

FOREIGN PATENT DOCUMENTS

| | | |
|---|---|---|
| CN | 1605636 A | 4/2005 |
| CN | 1678469 A | 10/2005 |
| CN | 1831303 A | 9/2006 |
| CN | 1910379 A | 2/2007 |
| CN | 100458201 C | 2/2009 |
| CN | 101400809 A | 4/2009 |
| CN | 101970704 A | 2/2011 |
| CN | 102859025 A | 1/2013 |
| EP | 0 626 468 A1 | 11/1994 |
| EP | 1455102 A2 | 9/2004 |
| EP | 1707831 A1 | 10/2006 |
| EP | 2025765 A1 | 2/2009 |
| EP | 2 253 728 A1 | 11/2010 |
| EP | 2 298 946 A2 | 3/2011 |
| EP | 2345822 A2 | 7/2011 |
| EP | 2 554 709 A1 | 2/2013 |
| EP | 2642145 A1 | 9/2013 |
| JP | H07-190072 A | 7/1995 |
| JP | H08-67962 A | 3/1996 |
| JP | H09-257041 A | 9/1997 |
| JP | H11-43739 A | 2/1999 |
| JP | H11-125259 A | 5/1999 |
| JP | 2000-145795 A | 5/2000 |
| JP | 2000-161363 A | 6/2000 |
| JP | 2001-323939 A | 11/2001 |
| JP | 2002-89569 A | 3/2002 |
| JP | 2003-13962 A | 1/2003 |
| JP | 2003-21148 A | 1/2003 |
| JP | 2003-226918 A | 8/2003 |
| JP | 2003-287040 A | 10/2003 |
| JP | 2003-301846 A | 10/2003 |
| JP | 2004-115903 A | 4/2004 |
| JP | 2004-137605 A | 5/2004 |
| JP | 2004-225743 A | 8/2004 |
| JP | 2004-278782 A | 10/2004 |
| JP | 2004-360732 A | 12/2004 |
| JP | 2005-113256 A | 4/2005 |
| JP | 2005-114148 A | 4/2005 |
| JP | 2005-121097 A | 5/2005 |
| JP | 2005-195148 A | 7/2005 |
| JP | 2005-308137 A | 11/2005 |
| JP | 2006-9887 A | 1/2006 |
| JP | 2006-44349 A | 2/2006 |
| JP | 2006-124780 A | 5/2006 |
| JP | 2006-200003 A | 8/2006 |
| JP | 2006-266496 A | 10/2006 |
| JP | 2006-322017 A | 11/2006 |
| JP | 2006-342901 A | 12/2006 |
| JP | 2007-046114 A | 2/2007 |
| JP | 2007-170680 A | 7/2007 |
| JP | 2007-177287 A | 7/2007 |
| JP | 2007-177897 A | 7/2007 |
| JP | 2007-277648 A | 10/2007 |
| JP | 2008-001967 A | 1/2008 |
| JP | 2008-106869 A | 5/2008 |
| JP | 2008-174821 A | 7/2008 |
| JP | 2008-174822 * | 7/2008 |
| JP | 2008-196033 A | 8/2008 |
| JP | 2008-267402 A | 11/2008 |
| JP | 2008-274353 A | 11/2008 |
| JP | 2009-150415 A | 7/2009 |
| JP | 2009-150507 A | 7/2009 |
| JP | 2009-150508 A | 7/2009 |
| JP | 2009-180327 * | 8/2009 |
| JP | 2009-185943 A | 8/2009 |
| JP | 2009-192071 A | 8/2009 |
| JP | 2009-222076 A | 10/2009 |
| JP | 2010-138933 A | 6/2010 |
| JP | 2010-248568 A | 11/2010 |
| JP | 2011-7286 A | 1/2011 |
| JP | 2011-084812 A | 4/2011 |
| JP | 2011-94784 A | 5/2011 |
| JP | 2011-94785 A | 5/2011 |
| JP | 2011-140992 A | 7/2011 |
| JP | 2011-141023 A | 7/2011 |
| JP | 2011-220357 A | 11/2011 |
| JP | 2012-107675 A | 6/2012 |
| JP | 2013-119930 A | 6/2013 |
| WO | 2007116875 A1 | 10/2007 |
| WO | 2011/122632 A1 | 10/2011 |

OTHER PUBLICATIONS

Chikara Oki, "Evaluation of Scratched Contact Fatigue Life with Artificial Dent of Carbonitrided SUJ2 Steel Whose Surface Nitro-

(56) References Cited

OTHER PUBLICATIONS gen Content is Controlled", NTN Technical Review, No. 78, NTN Corp., Oct. 2010, 20 to 28.
Chikara Oki, "Estimation of Nitrogen Concentration Distribution for Carbonitrided SUJ2 Steel", Journal of the Iron & Steel Institute of Japan, vol. 93, No. 3, The Iron and Steel Institute of Japan, Mar. 1, 2007 (Mar. 1, 2007), 220 to 227.
International Search Report dated Aug. 19, 2014, received in related International Application No. PCT/JP2014/064113, filed May 28, 2014 (translation is provided).
Chikara Ohki, "Evaluation of Scratched Contact Fatigue Life with Artificial Dent of Carbonitrided SUJ2 Steel Whose Surface Nitrogen Content is Controlled", NTN Technical Review, No. 78, NTN Corp. (2010), pp. 24-32 (Japanese version previously filed on Dec. 3, 2015).
Supplementary European Search Report dated Oct. 17, 2016, issued in related European Application No. 14807785.2.
Notice on the First Office Action dated May 4, 2017, issued in corresponding Chinese Patent Application No. 201480032223.4, with English language translation.
Marye: "Steel RAD 100Cr6", May 11, 2010 (May 11, 2010), XP055348300, Retrieved from the Internet <URL:http://www.aubertduval.com/uploads/tx_obladygestionproduit/RAD_GB.pdf>.
Extended European Search Report issued in corresponding European Patent Application No. EP 14 80 7601, dated Oct. 7, 2016.
Extended Search Report issued in corresponding European Patent Application No. 14807505.4, dated Mar. 9, 2017.
Office Action issued in corresponding Chinese Patent Application No. 201480032272.8, dated Dec. 22, 2016.
Mouri et al., "Improvement of Carburized Steel Wear Resistance by Heat Treatment", NTN Technical Review, No. 76, pp. 18-23, (2008).
Office Action issued in corresponding Chinese Patent Application No. 201480032216.4, dated Jun. 7, 2017.
Office Action issued in corresponding Japanese Application No. 2013-120137, dated Jan. 7, 2014.
Office Action issued in corresponding Japanese Application No. 2013-120142, dated Jan. 7, 2014.
Office Action issued in cross-related U.S. Appl. No. 14/895,470, dated May 18, 2017.
Office Action issued in cross-related U.S. Appl. No. 14/895,914, dated May 19, 2017.
Office Action issued in cross-related U.S. Appl. No. 14/896,265, dated May 18, 2017.
Ohki, Chikara, "Atmospheric Control Method for JIS-SUJ2 Carbonitriding Processes", NTN Technical Review, No. 74, pp. 44-53 (2006).
Office Action issued in U.S. Appl. No. 14/895,901 dated May 19, 2017.
International Search Report issued in International Application No. PCT/JP2014/064116 dated Aug. 19, 2014 (with English translation).
International Search Report issued in International Application No. PCT/JP2014/064117 dated Aug. 19, 2014 (with English translation).
Chinese Office Action issued in Chinese Application No. 201480032221.5 dated May 2, 2017 (with English translation).
Japanese Office Action issued in Japanese Application No. 2013-120140 dated Apr. 4, 2017 (with English translation).
Japanese Office Action issued in Japanese Application No. 2013-120138 dated Mar. 7, 2017 (with English translation).
Japanese Office Action issued in Japanese Application No. 2013-120139 dated Mar. 7, 2017 (with English translation).
Supplementary European Search Report issued in European Application No. EP 14 80 6819 dated Feb. 13, 2017.
International Search Report issued in International Application No. PCT/JP2014/064118 dated Aug. 19, 2014 (with English translation).
International Search Report issued in International Application No. PCT/JP20121081788 dated Mar. 5, 2013 (with English translation).
Information Offer Form submitted Mar. 30, 2015 regarding Japanese Application No. 2011-269037.
Information Offer Form submitted Mar. 30, 2015 regarding Japanese Application No. 2011-269102.
Information Offer Form submitted Mar. 30, 2017 regarding Japanese Application No. 2012-178416.
Notice of Allowance issued in U.S. Appl. No. 14/363,750 dated Aug. 4, 2015.
Japanese Office Action issued in Japanese Application No. 2011-269037 dated Sep. 1, 2015 (with English translation).
Partial Supplementary European Search Report issued in European Application No. 12855776.6 dated Nov. 30, 2015.
Japanese Office Action issued in Japanese Application No. 2012-164856 dated Feb. 16, 2016 (with English translation).
Japanese Office Action issued in Japanese Application No. 2012-164738 dated Mar. 1, 2016 (with English translation).
Japanese Office Action issued in Japanese Application No. 2012-178416 dated Mar. 1, 2016 (with English translation).
Japanese Office Action issued in Japanese Application No. 2012-164856 dated Jul. 19, 2016 (with English translation).
Japanese Office Action issued in Japanese Application No. 2015-242976 dated Oct. 25, 2016 (with English translation).
Chinese Office Action issued in Chinese Application No. 201510726275.8 dated Nov. 30, 2016 (with English translation).
Japanese Office Action issued in Japanese Application No. 2016-081905 dated Jan. 31, 2017 (with English translation).
Japanese Office Action issued in Japanese Application No. 2016-250792 dated Oct. 17, 2107 (with English translation).
Ohki, Chikara, "Estimation of Nitrogen Concentration Distribution for Carbonitrided SUJ2 Steel", Journal of the Iron & Steel Institute of Japan, vol. 93, No. 3, The Iron and Steel Institute of Japan, Mar. 1, 2007 (Mar. 1, 2007), pp. 20 to 27.
Chinese Office Action issued in Chinese Application No. 201480032272.8 dated Dec. 22, 2016 (with English translation).
Extended European Search Report issued in European Application No. 14807785.2 dated Oct. 17, 2016.
Notice of Grounds of Rejections issued in Japanese Patent Application No. 2016-250792 dated May 15, 2018 (with English translation).
Decision to Grant Patent issued in Japanese Patent Application No. 2017-146865 dated May 22, 2018 (with English lanslation).
Decision to Grant Patent issued in Japanese Patent Application No. 2017-146865 dated May 22, 2018 (with English tranlsation).
Notice of Grounds of Rejection issued in Japanese Patent Application No. 2016-250792 dated May 15, 2018 (with English translation).

\* cited by examiner

BEARING COMPONENT AND ROLLING BEARING

CROSS-REFERENCE

This application is the U.S. National Phase under 35 U.S.C. § 371 of International Application No. PCT/JP2014/064113, filed May 28, 2014, which claims the benefit of Japanese Application Nos. 2013-120143, filed Jun. 6, 2013 and 2013-120144, filed Jun. 6, 2013, the entire contents of each are hereby incorporated by reference.

TECHNICAL FIELD

The present invention relates to a bearing component and a rolling bearing and more particularly to a bearing component which is inexpensive and has improved yield strength and life and to a rolling bearing including the bearing component.

BACKGROUND ART

Carbonitriding treatment has been known as measures for improving durability of a bearing component included in a rolling bearing (see, for example, Japanese Patent Laying-Open No. 2007-277648 (PTD 1) and Japanese Patent Laying-Open No. 2008-267402 (PTD 2)). The carbonitriding treatment is heat treatment in which steel is heated to a temperature not lower than an $A_1$ transformation point for penetration and diffusion of carbon and nitrogen into steel and thereafter is quenched. The carbonitriding treatment is effective for extending scratched contact life which is important performance of the rolling bearing.

Other important functions of the rolling bearing include lower torque during rotary motion of a machine, and in order to achieve this, reduction in energy loss during rotation is important. Causes for energy loss during rotation of the rolling bearing include rolling viscous resistance, differential slip, elastic hysteresis loss, or stirring resistance of a lubricating oil. Based on comparison between a ball bearing and a roller bearing in the rolling bearing, energy loss is less in the ball bearing owing to a difference in rolling viscous resistance. Therefore, from a point of view of lower torque during rotary motion of the machine, the ball bearing can be concluded as a more preferred structure.

Since the roller bearing is greater in area of contact between bearing components (rolling bearing rings and balls) than the ball bearing, a contact pressure applied to the bearing component is lower. Therefore, from a point of view of bearing a greater load, the roller bearing is effective. When a great load is born by the ball bearing, however, the contact pressure is excessive and plastic deformation occurs in the rolling bearing ring or the ball. Then, torque in the rotary motion of the machine is higher, generation of unusual noise or lowering in rotation accuracy takes place, and consequently it becomes difficult to fulfill a function as a bearing. Thus, excessive load (contact pressure) which leads to functional failure as a bearing is called a "static load capacity" of the rolling bearing. Therefore, in lowering torque of the rolling bearing, a ball bearing made of a material less likely to plastically deform (high in yield strength) is preferably adopted.

A representative material which is less likely to plastically deform includes a ceramic material such as silicon nitride. This ceramic material, however, is difficult to work while it is less likely to plastically deform. Therefore, when the ceramic material is adopted as a material for a bearing, cost for working disadvantageously increases. Therefore, in place of a ceramic material, development of a material of which total cost including cost for working is low and which is less likely to plastically deform has been demanded. "Less likeliness of plastic deformation" does not relate to a hardness expressed by an HV hardness or an HRC hardness but to a region where an amount of plastic deformation close to elastic limit or yield strength is small.

CITATION LIST

Patent Document

PTD 1: Japanese Patent Laying-Open No. 2007-277648
PTD 2: Japanese Patent Laying-Open No. 2008-267402

SUMMARY OF INVENTION

Technical Problem

In consideration of demands for improvement in durability in bearing components in recent years, depending on applications, it may be difficult to provide sufficient durability through conventional carbonitriding treatment. In addition, it has conventionally been difficult to prevent plastic deformation without using a material high in cost for working such as silicon nitride in a ball bearing having a structure advantageous in lowering in torque.

The present invention was made in view of the problems above, and an object thereof is to provide a bearing component which is inexpensive and has improved yield strength and life and a rolling bearing including the bearing component.

Solution to Problem

A bearing component according to the present invention is composed of steel which contains carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and is composed of remainder iron and an impurity and has a carbonitrided layer formed at a surface portion including a contact surface which is a surface in contact with other components. In the bearing component, an average concentration of nitrogen in the surface portion is not lower than 0.3 mass % and not higher than 0.6 mass % and variation in nitrogen concentration in the surface portion is not higher than 0.1 mass %. In the bearing component, an amount of retained austenite in the surface portion is not greater than 8 volume %. In the bearing component, an area ratio of a precipitate in the inside where no carbonitrided layer is formed is not lower than 11%.

The present inventor has conducted dedicated studies about measures for improving yield strength and also life without using a material high in cost for working. Consequently, the present inventor has obtained the finding below and derived the present invention.

In a bearing component, such a damage as a crack is likely to occur at a contact surface (for example, a raceway surface of a rolling bearing ring, or a rolling contact surface of a ball and a roller) which is in contact with other components and a portion directly under the contact surface. In order to address this, durability of the bearing component can be improved by subjecting the contact surface to carbonitriding treatment.

According to the studies conducted by the present inventor, when a nitrogen concentration in the surface portion including the contact surface is lower than 0.2 mass %, scratched contact life of the bearing component is shorter. Therefore, in order to suppress shorter life of the bearing component, the nitrogen concentration in the surface portion should be not lower than 0.2 mass %. When a nitrogen concentration in the surface portion exceeds 0.7 mass %, most of chromium in a matrix disappears. Then, hardenability lowers and consequently incomplete quenching tends to occur. Therefore, in order to suppress lowering in hardenability and occurrence of incomplete quenching, a nitrogen concentration in the surface portion should be not higher than 0.7 mass %.

The bearing component is manufactured by subjecting a formed steel product to heat treatment such as carbonitriding treatment or tempering treatment and thereafter subjecting the contact surface to finishing. The steel product may deform owing to the heat treatment (for example, a rolling bearing ring may be in an oval shape and a circularity may become poor) and grinding allowance during finishing may vary. Therefore, in a conventional bearing component, variation in nitrogen concentration in the surface portion has disadvantageously been great.

In contrast, in the bearing component according to the present invention, an average concentration of nitrogen in the surface portion is not lower than 0.3 mass and not higher than 0.6 mass % and variation in nitrogen concentration in the surface portion is lessened to 0.1 mass % or lower. Therefore, in the bearing component, a nitrogen concentration in the surface portion is not lower than 0.2 mass % and not higher than 0.7 mass %, and shorter scratched contact life is suppressed. Therefore, according to the bearing component in the present invention, a bearing component having improved life can more reliably be provided.

According to the studies conducted by the present inventor, a heating temperature during tempering treatment is higher than in a conventional example, so that an amount of retained austenite in the surface portion is decreased to 8 volume % or lower, an area ratio of a precipitate in the inside where no carbonitrided layer is formed is improved to 11% or higher, and consequently yield strength of a material is improved. Namely, in the bearing component in which an amount of retained austenite in the surface portion has decreased to 8 volume % or lower and an area ratio of a precipitate in the inside has improved to 11% or higher, plastic deformation of a material can be suppressed without using a material which is high in cost for working, such as silicon nitride.

As described above, life of the bearing component can be improved by increasing a nitrogen concentration in the surface portion. In the conventional bearing component, however, with increase in nitrogen concentration in the surface portion, yield strength of a material lowers and hence it has been difficult to achieve both of improvement in yield strength and improvement in life. In contrast, according to the studies conducted by the present inventor, when a tempering temperature is higher than in a conventional example, trade-off between yield strength and life is overcome. Namely, even when a nitrogen concentration in the surface portion is increased to the range above by setting an amount of retained austenite in the surface portion to 8 volume % or lower and setting an area ratio of a precipitate in the inside to 11% or higher by increasing a tempering temperature, lowering in yield strength can be suppressed. Therefore, according to the bearing component in the present invention, a bearing component which is inexpensive and has improved yield strength and life can be provided.

In the bearing component according to the present invention, the "surface portion" means a region extending from the contact surface to a depth of 20 µm in a direction of thickness of the bearing component. The "average concentration of nitrogen in the surface portion" and "variation in nitrogen concentration in the surface portion" are as defined in an embodiment of the present invention which will be described later.

Reasons why a composition of components in steel forming the bearing component according to the present invention is set to the range above will now be described.

Carbon: Not Less than 0.95 Mass % and not More than 1.1 Mass %

A content of carbon significantly affects a hardness and an amount of carbide of a bearing component after quench-hardening. When a content of carbon in steel is not less than 0.95 mass %, sufficient hardness and amount of carbide can be achieved without introducing much carbon into steel through heat treatment. When a content of carbon exceeds 1.1 mass %, large carbide is formed at the time point of manufacturing of steel, and the carbide may adversely affect durability of the bearing component. Therefore, the content of carbon is not less than 0.95 mass % and not more than 1.1 mass %.

Silicon: Less than 0.3 Mass %

Silicon increases an amount of occlusion of hydrogen in steel and accelerates hydrogen embrittlement. When a content of silicon in steel is 0.3 mass % or higher, flaking due to hydrogen embrittlement tends to occur in applications in which hydrogen readily penetrates into steel. Therefore, in the bearing component, a content of silicon in steel is less than 0.3 mass %.

Manganese: Less than 0.5 Mass %

Manganese contributes to hardenability of steel and a hardness of yet-to-be quenched steel. When a content of manganese is not lower than 0.5 mass %, however, a hardness of a yet-to-be quenched material is high and workability in a cold process lowers. Therefore, the content of manganese is lower than 0.5 mass %.

Sulfur: Less than 0.008 Mass %

Sulfur is chemically bonded to manganese or the like and forms a non-metallic inclusion such as manganese sulfide. This non-metallic inclusion can adversely affect life of a bearing. Therefore, in the bearing component, a content of sulfur in steel is less than 0.008 mass %.

Chromium: Not Less than 1.4 Mass % and Less than 1.6 Mass %

Chromium contributes to improvement in hardenability of steel. Since a content of silicon is low in order to prevent flaking due to hydrogen embrittlement in the bearing component according to the present invention, hardenability has been lowered. Then, in order to compensate for lowering in hardenability due to decrease in content of silicon, in the bearing component, a content of chromium in steel is not less than 1.4 mass % and less than 1.6 mass %.

In the bearing component, the amount of retained austenite in the surface portion may be not greater than 5 volume %.

When a tempering temperature is further increased, an amount of retained austenite in the surface portion decreases to 5 volume % or lower. Thus, yield strength of a material can further be improved.

In the bearing component, the area ratio of the precipitate in the inside where no carbonitrided layer is formed may be not lower than 12%.

When a tempering temperature is further increased as described above, not only an amount of retained austenite in the surface portion lowers to 5 volume % or lower but also an area ratio of a precipitate in the inside improves to 12% or higher. Thus, yield strength of a material can similarly further be improved.

In the bearing component, an inclination of nitrogen concentration in a direction of thickness of the bearing component may be not less than −15 (l/m). An inclination of the nitrogen concentration is determined as described in Examples which will be described later. Thus, variation in nitrogen concentration in the surface portion after the contact surface is finished can readily be lessened.

The "inclination of the nitrogen concentration" may be an inclination of a nitrogen concentration before the contact surface is subjected to finishing such as grinding treatment, or an inclination of a nitrogen concentration after the contact surface is finished (that is, a state as a product). Namely, in the bearing component, an inclination of the nitrogen concentration may be not less than −15 (l/m) before the contact surface is finished, an inclination of the nitrogen concentration may be not less than −15 (l/m) after finishing, or an inclination of the nitrogen concentration may be not less than −15 (l/m) before and after finishing.

In the bearing component, the surface portion may include five or more carbonitrides per 100 μm², the carbonitride having a diameter not smaller than 0.3 μm and not greater than 0.5 μm.

According to the studies conducted by the present inventor, when the surface portion includes five or more carbonitrides per 100 μm², the carbonitride having a diameter not smaller than 0.3 μm and not greater than 0.5 μM, a static load capacity of the bearing component improves owing to precipitation strengthening of the carbonitride. Therefore, by defining an amount of existence of the carbonitride in the surface portion to the range above, a static load capacity of the bearing component can further be improved. In this case, a concentration of carbon in the surface portion is not lower than 0.9 mass % and not higher than 1.1 mass %.

Here, the "surface portion having five or more carbonitrides per 100 μm², the carbonitride having a diameter not smaller than 0.3 μm and not greater than 0.5 μm" means that, when the surface portion of a cross-section obtained by cutting the bearing component along a cross-section perpendicular to the contact surface is observed with a microscope, five or more carbonitrides having a diameter not smaller than 0.3 μm and not greater than 0.5 μm are observed per 100 μm². The "carbonitride" is such a substance that a carbide of iron or a part of carbon in the carbide has been substituted with nitrogen and includes an Fe—C based compound and an Fe—C—N based compound. This carbonitride may contain an alloy element contained in steel, such as chromium.

In the bearing component, the nitrogen concentration in a non-ground portion including a non-ground surface which is a surface other than the contact surface may be lower than 0.7 mass %.

According to the studies conducted by the present inventor, when a nitrogen concentration in the non-ground portion is not lower than 0.7 mass %, hardenability lowers and an incompletely quenched structure tends to be produced. Therefore, in order to suppress lowering in hardenability and production of an incompletely quenched structure, a nitrogen concentration in the non-ground portion is preferably lower than 0.7 mass %. The "non-ground portion" means a region extending from a non-ground surface to a depth of 20 μm in a direction of thickness of the bearing component. In this case, a hardness at a position at a depth of 0.1 mm from the non-ground surface is not lower than 700 HV.

In the bearing component, after heat treatment in which a heating temperature is set to 500° C. and a retention time period is set to 1 hour, a Vickers hardness at a position at a depth of 0.4 (mm) from the contact surface may be higher by at least 80 HV than a Vickers hardness in a region where no carbonitrided layer is formed in a direction of thickness of the bearing component.

Thus, a nitrogen concentration in the contact surface not lower than 0.4 mass can be ensured.

In the bearing component, crystal grains of prior austenite in the inside where no carbonitrided layer is formed may have a grain size number not smaller than No. 9 and not greater than No. 11 defined under JIS.

By thus making a steel structure in the inside where no carbonitrided layer is formed finer, durability of the bearing component can further be improved.

A rolling bearing according to the present invention includes the bearing component according to the present invention which has improved yield strength and life. Therefore, according to the rolling bearing in the present invention, a rolling bearing having improved durability can be provided.

Advantageous Effects of Invention

As is clear from the description above, according to the bearing component in the present invention, a bearing component which is inexpensive and has improved yield strength and life can be provided. In addition, according to the rolling bearing in the present invention, a rolling bearing having improved durability can be provided.

DESCRIPTION OF EMBODIMENTS

Figure 1:
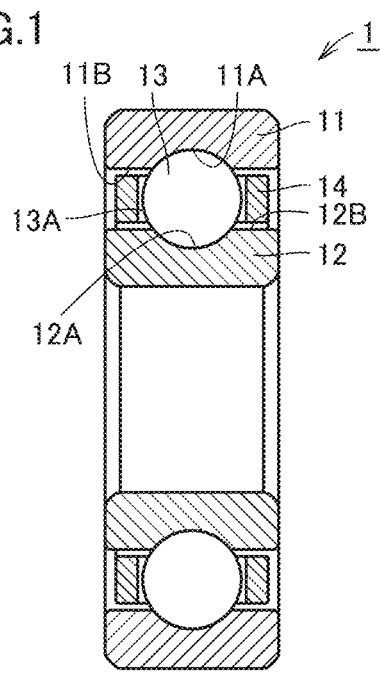
FIG. 1 is a schematic cross-sectional view showing a structure of a deep-groove ball bearing according to the present embodiment.

An embodiment of the present invention will be described hereinafter with reference to the drawings. In the drawings below, the same or corresponding elements have the same reference characters allotted and description thereof will not be repeated.

A structure of a deep-groove ball bearing 1 as a rolling bearing according to the present embodiment will initially be described with reference to FIG. 1. Deep-groove ball bearing 1 includes an annular outer ring 11, an annular inner ring 12 arranged on an inner side of outer ring 11, and a plurality of balls 13 which are arranged between outer ring 11 and inner ring 12 and serve as rolling elements each held by an annular cage 14. An outer ring raceway surface 11A is formed on an inner circumferential surface of outer ring 11, and an inner ring raceway surface 12A is formed on an outer circumferential surface of inner ring 12. Inner ring 12 is arranged on the inner side of outer ring 11 such that inner ring raceway surface 12A is opposed to outer ring raceway surface 11A. The plurality of balls 13 are in contact with outer ring raceway surface 11A and inner ring raceway surface 12A at a rolling contact surface 13A, and arranged at a prescribed pitch in a circumferential direction by means of cage 14. Thus, the plurality of balls 13 are held on an annular raceway of outer ring 11 and inner ring 12 in a freely rolling manner. According to such a construction, outer ring 11 and inner ring 12 of deep-groove ball bearing 1 can rotate relatively to each other. Outer ring 11, inner ring 12, and balls 13 represent bearing components according to the present embodiment which will be described later.

A structure of the bearing component (outer ring 11, inner ring 12, and balls 13) according to the present embodiment will now be described. The bearing component is composed of steel containing carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and composed of remainder iron and an impurity. The bearing component has a contact surface (outer ring raceway surface 11, inner ring raceway surface 12A, and rolling contact surface 13A) in contact with other components and a carbonitrided layer is formed in a surface portion including the contact surface.

In the bearing component, an average concentration of nitrogen in the surface portion is not lower than 0.3 mass % and not higher than 0.6 mass % and variation in nitrogen concentration in the surface portion is not higher than 0.1 mass %. Thus, in the bearing component, scratched contact life is improved and production of an incompletely quenched structure is also suppressed. In the bearing component, the steel structure is made finer to such an extent that crystal grains of prior austenite in the inside where no carbonitrided layer is formed have a grain size number not smaller than No. 9 and not greater than No. 11 defined under JIS. Therefore, the bearing component has improved durability. In the bearing component, an amount of retained austenite in the surface portion is not greater than 8 volume % (preferably not greater than 5 volume %). In the bearing component, an area ratio of a precipitate in the inside where no carbonitrided layer is formed (an unnitrided region) is not lower than 11% (preferably not lower than 12%). Thus, yield strength of a material for the bearing component is improved. Therefore, the bearing component (outer ring 11, inner ring 12, and balls 13) has improved yield strength and life, and deep-groove ball bearing 1 including the bearing component has improved durability. The "precipitate" refers to a carbonitride resulting from substitution of a carbide of iron or a part of carbon in the carbide with nitrogen, and includes an Fe—C based compound and an Fe—C—N based compound. This carbonitride may contain an alloy component contained in steel, such as chromium.

In the bearing component, the "average concentration of nitrogen in the surface portion" and "variation in nitrogen concentration in the surface portion" are measured as follows. Here, measurement in connection with inner ring 12 will be described by way of example.

Figure 2:
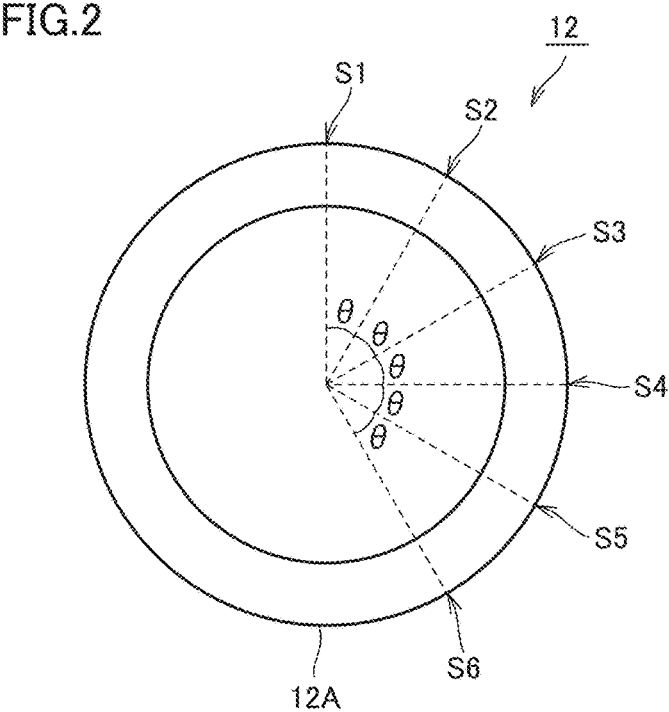
FIG. 2 is a schematic diagram for illustrating a method of measuring a nitrogen concentration in a bearing component according to the present embodiment.

Referring to FIG. 2, initially, a measurement point S1 is set at any location on the contact surface of inner ring 12 (inner ring raceway surface 12A). Then, a measurement point S2 displaced by θ (30°) in a circumferential direction from measurement point S1, a measurement point S3 displaced by θ (30°) in the circumferential direction from measurement point S2, a measurement point S4 displaced by θ (30°) in the circumferential direction from measurement point S3, a measurement point S5 displaced by θ (30°) in the circumferential direction from measurement point S4, and a measurement point S6 displaced by θ (30°) in the circumferential direction from measurement point S5 are set. A plurality of measurement points S1 to S6 displaced along the circumferential direction on the contact surface of inner ring 12 by 30° each are thus set. Measurement points S1 to S6 are set in an axially central portion on the contact surface of inner ring 12.

The rolling bearing ring such as inner ring 12 may deform into an oval shape through heat treatment and a circularity may become poor, which may lead to variation in nitrogen concentration in the surface portion after grinding. In contrast, when measurement points S1 to S6 displaced along the circumferential direction by 30° each are set, the measurement points are arranged as being distributed over a region covering substantially half in the circumferential direction and hence a maximum value and a minimum value for the nitrogen concentration can substantially be included among measurement points S1 to S6. Therefore, the "average concentration of nitrogen in the surface portion" and "variation in nitrogen concentration in the surface portion" can more accurately be evaluated by making evaluation based on measurement values at measurement points S1 to S6.

Figure 3:
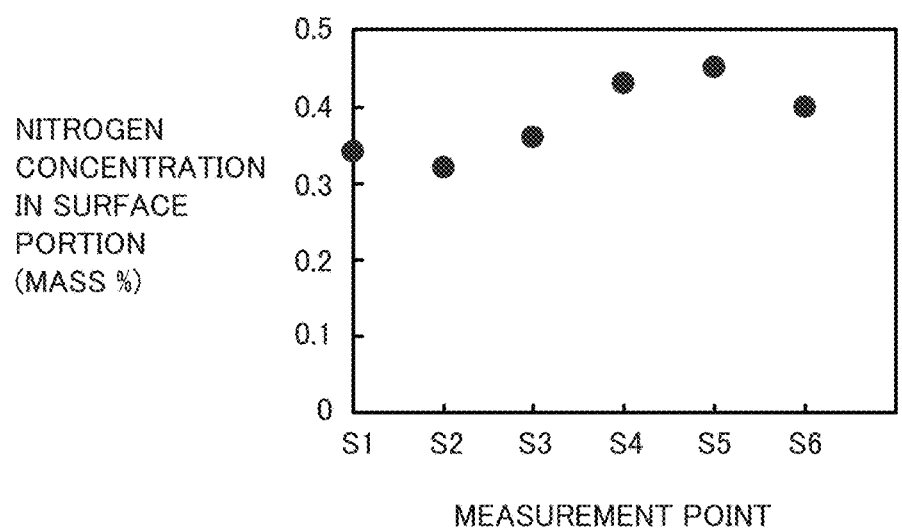
FIG. 3 is a graph showing a result of measurement of a nitrogen concentration in the bearing component according to the present embodiment.

FIG. 3 shows a nitrogen concentration in the surface portion (ordinate) measured at measurement points S1 to S6 (abscissa). An average value of nitrogen concentrations shown on the ordinate in FIG. 3 can be defined as the "average concentration of nitrogen in the surface portion." A largest value of differences between the "average concentration of nitrogen in the surface portion" and measurement values at measurement points S1 to S6 can be defined as "variation in nitrogen concentration in the surface portion."

In the bearing component (outer ring 11, inner ring 12, and balls 13), an inclination of a nitrogen concentration in the direction of thickness before the contact surface (outer ring raceway surface 11A, inner ring raceway surface 12A, and rolling contact surface 13A) is finished may be not less than −15 (1/m). Thus, variation in nitrogen concentration in the surface portion can be lessened to 0.1 mass % or lower after the contact surface is finished. In the bearing component, an inclination of a nitrogen concentration in the direction of thickness may be not less than −15 (1/m) also after the contact surface is finished.

In the bearing component (outer ring 11, inner ring 12, and balls 13), the surface portion may include five or more carbonitrides per 100 µm², the carbonitride having a diameter not smaller than 0.3 µm and not greater than 0.5 µm. Thus, a static load capacity of the bearing component can further be improved.

In the bearing component (outer ring 11, inner ring 12, and balls 13), a nitrogen concentration in the non-ground portion including non-ground surfaces 11B and 12B which are surfaces other than the contact surface (outer ring raceway surface 11A, inner ring raceway surface 12A, and rolling contact surface 13A) may be lower than 0.7 mass %. Thus, lowering in hardenability and production of an incompletely quenched structure can be suppressed.

In the bearing component (outer ring 11, inner ring 12, and balls 13), after heat treatment in which a heating temperature is set to 500° C. and a retention time period is set to 1 hour, a Vickers hardness at a position at a depth of 0.4 (mm) from the contact surface (outer ring raceway surface 11A, inner ring raceway surface 12A, and rolling contact surface 13A) may be higher by at least 80 HV than a Vickers hardness in a region where no carbonitrided layer is formed in the direction of thickness of the bearing component. Thus, it can be ensured that a nitrogen concentration in the contact surface is not lower than 0.4 mass %.

A method of manufacturing a bearing component according to the present embodiment will now be described. In the method of manufacturing a bearing component according to the present embodiment, the bearing component (outer ring 11, inner ring 12, and balls 13) according to the present embodiment can be manufactured.

Figure 4:
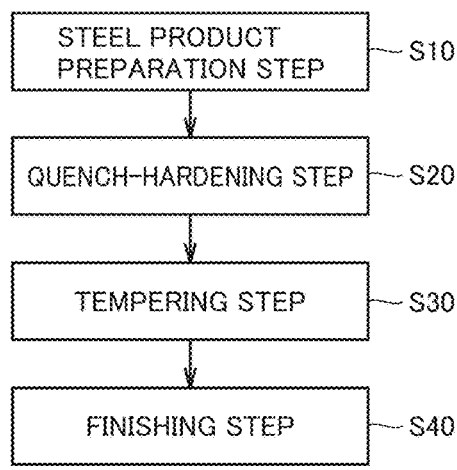
FIG. 4 is a flowchart for illustrating a method of manufacturing a bearing component according to the present embodiment.

Referring to FIG. 4, initially, in a step (S10), a steel product preparation step is performed. In this step (S10), initially, a steel product containing carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and composed of remainder iron and an impurity is prepared. Then, the steel product is formed in an approximate shape of the bearing component. For example, bar steel or a steel wire is employed as a source material, the bar steel or the steel wire is cut, forged, or turned, and thus a steel product formed into an approximate shape of outer ring 11, inner ring 12, and balls 13 representing the bearing component is prepared.

Then, in a step (S20), a quench-hardening step is performed. In this step (S20), the steel product prepared in the step (S10) is successively subjected to carbonitriding treatment and nitrogen diffusion treatment, and thereafter the steel product is cooled to a temperature not higher than an $M_s$ point (martensite transformation starting point). This step (S20) will be described in detail later.

Then, in a step (S30), a tempering step is performed. In this step (S30), the steel product quench-hardened in the step (S20) is subjected to heat treatment at a temperature not higher than the $A_1$ point. More specifically, after the step (S20) is completed, the steel product is held for a prescribed period of time (for example, 2 hours) at a temperature not lower than 240° C. which is a temperature not higher than the $A_1$ point and preferably a temperature not lower than 240° C. and not higher than 260° C., so that the steel product is tempered. Thereafter, the steel product is cooled by air at a room temperature (air cooling). Toughness of the steel product can thus be improved.

Then, in a step (S40), a finishing step is performed. In this step (S40), the contact surface (outer ring raceway surface 11A, inner ring raceway surface 12A, and rolling contact surface 13A) which has been tempered is ground. Thus, outer ring 11, inner ring 12, and balls 13 (see FIG. 1) representing the bearing component according to the present embodiment are manufactured and the method of manufacturing a bearing component according to the present embodiment is completed. Then, deep-groove ball bearing 1 (see FIG. 1) is manufactured by combining manufactured outer ring 11, inner ring 12, and balls 13 with one another.

Figure 5:
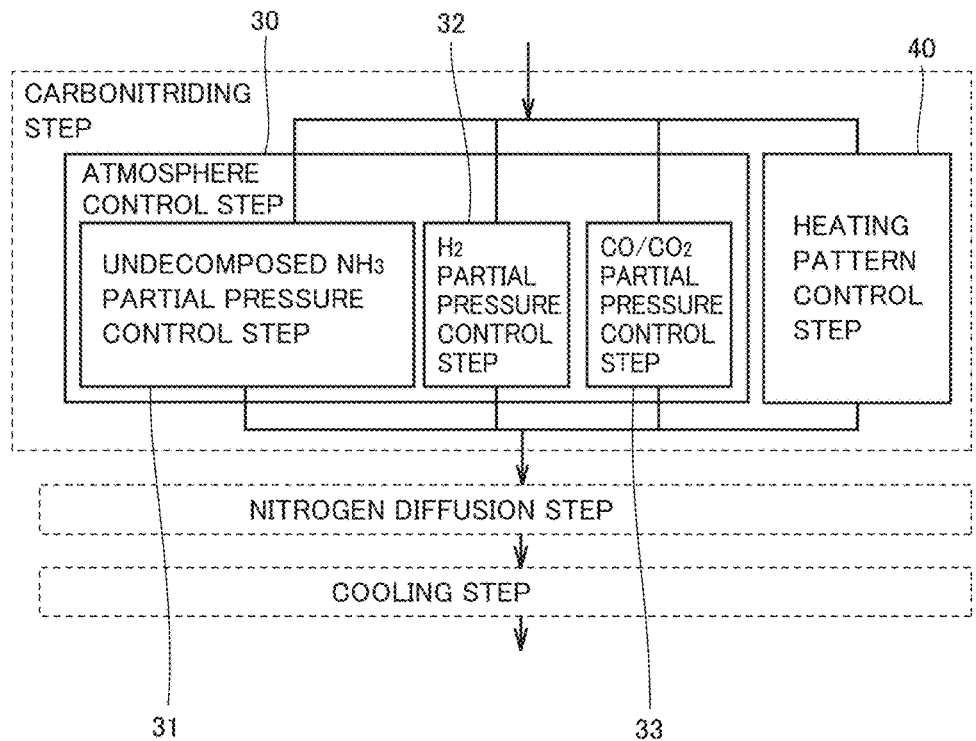
FIG. 5 is a schematic diagram for illustrating details of a quench-hardening step (S20) in the method of manufacturing a bearing component according to the present embodiment.
Figure 6:
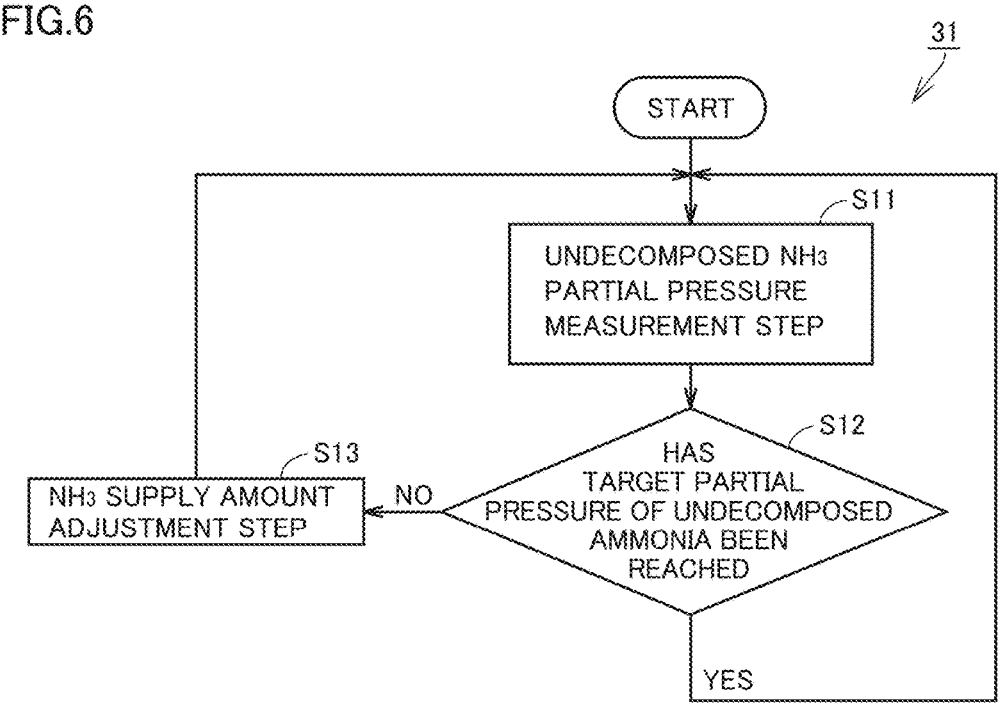
FIG. 6 is a schematic diagram for illustrating an undecomposed $NH_3$ partial pressure control step included in an atmosphere control step in FIG. 5.
Figure 7:
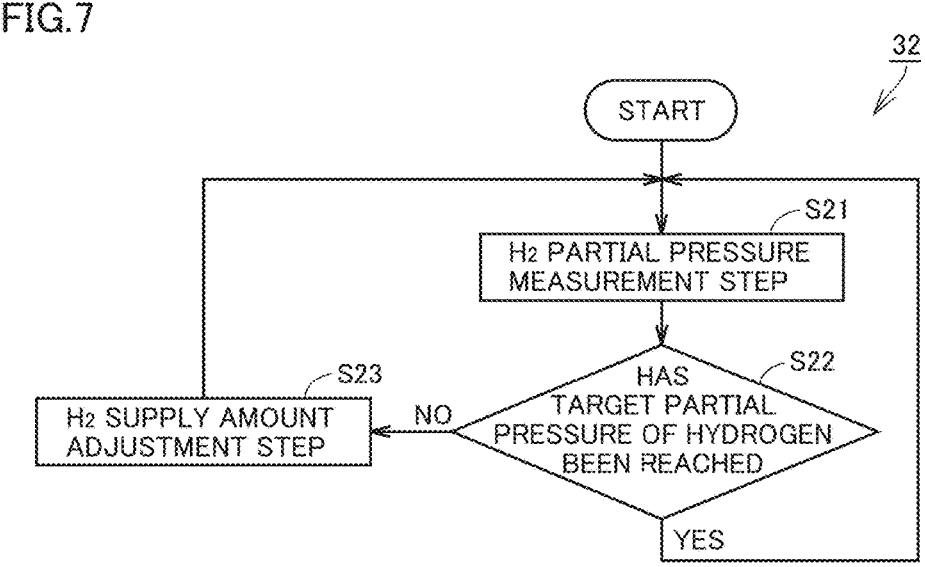
FIG. 7 is a diagram for illustrating an $H_2$ partial pressure control step included in the atmosphere control step in FIG. 5.
Figure 8:
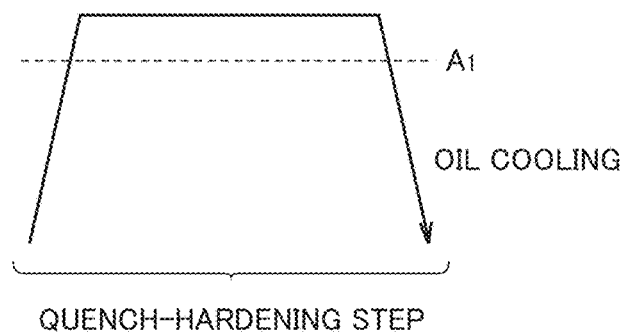
FIG. 8 is a diagram showing one example of a heating pattern in a heating pattern control step included in a carbonitriding step in FIG. 5.

The quench-hardening step (S20) will now be described in detail with reference to FIGS. 5 to 8. FIG. 5 is a diagram for illustrating in detail the quench-hardening step (S20). FIG. 6 is a diagram for illustrating an undecomposed ammonia ($NH_3$) partial pressure control step included in an atmosphere control step in FIG. 5. FIG. 7 is a diagram for illustrating a hydrogen ($H_2$) partial pressure control step included in the atmosphere control step in FIG. 5. FIG. 8 is a diagram showing one example of a heating pattern (a temperature history) in a heating pattern control step included in the carbonitriding step in FIG. 5. In FIG. 8, a lateral direction represents time and the direction to the right indicates lapse of time.

Referring to FIG. 5, in the quench-hardening step (S20), initially, the carbonitriding step in which the steel product prepared in the step (S10) is carbonitrided is performed. Then, the nitrogen diffusion step for diffusing nitrogen which has penetrated into steel in the carbonitriding step is performed. Then, after the nitrogen diffusion step is completed, a cooling step in which the steel product is cooled to a temperature not higher than the $M_s$ point is performed. In the carbonitriding step, the steel product is heated in an atmosphere containing ammonia, carbon monoxide, carbon dioxide, and hydrogen.

The carbonitriding step includes an atmosphere control step 30 of controlling an atmosphere in a heat treatment furnace and a heating pattern control step 40 of controlling a temperature history provided to the steel product which is an object to be treated in the heat treatment furnace. Atmosphere control step 30 and heating pattern control step 40 can be performed independently and in parallel. Atmosphere control step 30 includes an undecomposed $NH_3$ partial pressure control step 31 of controlling a partial pressure of undecomposed ammonia in the heat treatment furnace, an $H_2$ partial pressure control step 32 of controlling a partial pressure of hydrogen in the heat treatment furnace, and a $CO/CO_2$ partial pressure control step 33 of controlling a partial pressure of at least any one of carbon monoxide and carbon dioxide in the heat treatment furnace.

In $CO/CO_2$ partial pressure control step 33, referring to an expression (1) below, a partial pressure of at least any one of carbon monoxide and carbon dioxide in the heat treatment furnace is controlled so that a carbon activity ($a_c^*$) is controlled. In terms of definition of the activity, strictly, a condition of $a_c>1$ is never satisfied. Therefore, when a condition of $a_c^* \leq 1$ is satisfied, $a_c^*=ac$ is defined, and when $a_c^*>1$ (for example, a partial pressure of carbon monoxide ($P_{CO}$) is high and a partial pressure of carbon dioxide ($P_{CO2}$) is low), $a_c^*$ is defined as a variable in accordance with the expression (1) below.

$$a_c^* = \frac{(Pco)^2}{K \times Pco_2} \quad (1)$$

Pco: partial pressure (atm) of carbon monoxide, $Pco_2$: partial pressure (atm) of carbon dioxide K: equilibrium constant in $<C>+CO_2 \Leftrightarrow 2CO$ Then, in atmosphere control step 30, undecomposed $NH_3$ partial pressure control step 31, $H_2$ partial pressure control step 32, and $CO/CO_2$ partial pressure control step 33 are performed such that $a_c^*$ defined in the expression (1) is not smaller than 0.88 and not greater than 1.27 (preferably not smaller than 0.9 and not more than 1.1) and a value for a expressed in an expression (2) below is not smaller than 0.012 and not greater than 0.020 (preferably not smaller than 0.013 and not greater than 0.018). In the expression (2), $P_N$ (atm) represents a partial pressure of undecomposed ammonia and $P_H$ (atm) represents a partial pressure of hydrogen.

$$\alpha = \frac{P_N}{0.006 \times (P_H)^{\frac{3}{2}}} \times \frac{(1.877 - 1.055 \times a_c^*)}{100} \quad (2)$$

Specifically, referring to FIG. 6, in undecomposed $NH_3$ partial pressure control step 31, initially, an undecomposed $NH_3$ partial pressure measurement step (S11) of measuring a partial pressure of undecomposed ammonia in the heat treatment furnace is performed. A partial pressure of undecomposed ammonia can be measured, for example, with a gas chromatograph or an infrared analyzer. Then, an undecomposed $NH_3$ partial pressure determination step (S12) of determining whether or not to perform an $NH_3$ supply amount adjustment step (S13) of increasing or decreasing an amount of supply of an ammonia gas into the heat treatment furnace based on the partial pressure of undecomposed ammonia measured in the step (S11) is performed. Determination is made by comparing a target partial pressure of undecomposed ammonia determined in advance such that a value for $\alpha$ is not smaller than 0.012 and not greater than 0.020 and a measured partial pressure of undecomposed ammonia with each other and determining whether or not a measured partial pressure of undecomposed ammonia has attained to the target partial pressure of undecomposed ammonia.

When the partial pressure of undecomposed ammonia has not attained to the target partial pressure of undecomposed ammonia, the step (S13) of increasing or decreasing the partial pressure of undecomposed ammonia in the heat treatment furnace is performed and thereafter the step (S11) is performed again. The step (S13) can be performed, for example, by adjusting an amount of ammonia (a flow rate of an ammonia gas) which flows from a canister of the ammonia gas coupled through a pipe to the heat treatment furnace into the heat treatment furnace in a unit time by using a flow rate control device including a mass flow controller attached to the pipe. Namely, the step (S13) can be performed by lowering the flow rate when the measured partial pressure of undecomposed ammonia is higher than the target partial pressure of undecomposed ammonia and increasing the flow rate when the measured partial pressure of undecomposed ammonia is lower than the target partial pressure of undecomposed ammonia. In this step (S13), when there is a prescribed difference between the measured partial pressure of undecomposed ammonia and the target partial pressure of undecomposed ammonia, how much the flow rate is to be increased or decreased can be determined based on relation between increase and decrease in flow rate of the ammonia gas and increase and decrease in partial pressure of undecomposed ammonia experimentally determined in advance.

When the partial pressure of undecomposed ammonia has attained to the target partial pressure of undecomposed ammonia, the step (S11) is again performed without performing the step (S13).

$H_2$ partial pressure control step 32 is performed similarly to undecomposed $NH_3$ partial pressure control step 31 described above. Namely, referring to FIG. 7, in $H_2$ partial pressure control step 32, initially, an $H_2$ partial pressure measurement step (S21) of measuring a partial pressure of hydrogen in the heat treatment furnace is performed. A partial pressure of hydrogen can be measured, for example, with a thermal conductivity gas analyzer. Then, a hydrogen partial pressure determination step (S22) of determining whether or not to perform an $H_2$ supply amount adjustment step (S23) of increasing or decreasing an amount of supply of a hydrogen gas into the heat treatment furnace based on the partial pressure of hydrogen measured in the step (S21) is performed. Determination is made by comparing a target partial pressure of hydrogen determined in advance such that a value for a is not smaller than 0.012 and not greater than 0.020 and a measured partial pressure of hydrogen with each other and determining whether or not the measured partial pressure of hydrogen has attained to the target partial pressure of hydrogen.

When the partial pressure of hydrogen has not attained to the target partial pressure of hydrogen, the step (S23) for increasing or decreasing a partial pressure of hydrogen in the heat treatment furnace is performed, and thereafter the step (S21) is performed again. The step (S23) can be performed, for example, by adjusting an amount of hydrogen (a flow rate of a hydrogen gas) which flows from a canister of the hydrogen gas coupled through a pipe to the heat treatment furnace into the heat treatment furnace in a unit time by using a flow rate control device including a mass flow controller attached to the pipe. Namely, the step (S23) can be performed by lowering the flow rate when the measured partial pressure of hydrogen is higher than the target partial pressure of hydrogen and increasing the flow rate when the measured partial pressure of hydrogen is lower than the target partial pressure of hydrogen. When there is a prescribed difference between the measured partial pressure of hydrogen and the partial pressure of hydrogen in this step (S23), how much the flow rate is to be increased or decreased can be determined based on relation between increase and decrease in flow rate of the hydrogen gas and increase and decrease in partial pressure of hydrogen experimentally determined in advance, as in a case of ammonia.

When the partial pressure of hydrogen has attained to the target partial pressure of hydrogen, the step (S21) is performed again without performing the step (S23).

Referring to FIG. 5, in $CO/CO_2$ partial pressure control step 33, an amount of supply of a propane ($C_3H_8$) gas or a butane gas ($C_4H_{10}$) as an enrichment gas is adjusted so that a partial pressure of at least any one of CO and $CO_2$ is adjusted and $a_c^*$ is adjusted. Specifically, a partial pressure of carbon monoxide $P_{CO}$ and a partial pressure of carbon dioxide $P_{CO2}$ in an atmosphere are measured, for example, with an infrared gas concentration measurement device. Then, an amount of supply of the propane ($C_3H_8$) gas or the butane gas ($C_4H_{10}$) as an enrichment gas is adjusted based on the measurement value such that $a_c^*$ defined in the expression (1) attains to a target value within a range not smaller than 0.88 and not greater than 1.27.

Here, a value for α can be controlled by varying at least any one of a partial pressure of undecomposed ammonia, a partial pressure of hydrogen, and $a_c^*$ through undecomposed $NH_3$ partial pressure control step 31, $H_2$ partial pressure control step 32, and $CO/CO_2$ partial pressure control step 33 with reference to the expression (2). Namely, for example, a value for a may be controlled by varying a partial pressure of hydrogen through $H_2$ partial pressure control step 32 while a partial pressure of undecomposed ammonia and $a_c^*$ are kept constant through undecomposed $NH_3$ partial pressure control step 31 and $CO/CO_2$ partial pressure control step 33, or may be controlled by varying a partial pressure of undecomposed ammonia through undecomposed $NH_3$ partial pressure control step 31 while a partial pressure of hydrogen and a value for $a_c^*$ are kept constant through $H_2$ partial pressure control step 32 and $CO/CO_2$ partial pressure control step 33.

Referring to FIG. 5, in heating pattern control step 40, a history of heating provided to the steel product is controlled. Specifically, as shown in FIG. 8, the steel product is heated to a temperature not lower than 820° C. and not higher than 880° C. (preferably not lower than 830° C. and not higher than 870° C.) which is not lower than the $A_1$ transformation point in an atmosphere controlled in atmosphere control step 30 described above and held for a time period not shorter than 180 minutes and not longer than 600 minutes (preferably not shorter than 240 minutes and not longer than 480 minutes). Then, as the retention time period elapses, heating pattern control step 40 ends and at the same time atmosphere control step 30 also ends.

Referring to FIG. 5, after the carbonitriding step ends, the nitrogen diffusion step is performed. In this step, the steel product is heated to a temperature not higher than a treatment temperature in the carbonitriding step and held for a time period not shorter than 30 minutes and not longer than 120 minutes (preferably not shorter than 45 minutes and not longer than 90 minutes). Nitrogen which has penetrated into steel can thus be diffused. In this step, an atmosphere in the heat treatment furnace is controlled such that $a_c^*$ is not smaller than 0.88 and not greater than 1.27 (preferably not smaller than 0.9 and not greater than 1.1) and a value for a is not smaller than 0.003 and not greater than 0.012 (preferably not smaller than 0.003 and not greater than 0.008). The value for $a_c^*$ and the value for a can be controlled as in the carbonitriding step.

Referring to FIG. 5, the cooling step is performed after the nitrogen diffusion step ends. In this step, the steel product is cooled to a temperature not higher than the $M_s$ point as the steel product is immersed in oil (oil cooling). As the steps above (the carbonitriding step, the nitrogen diffusion step, and the cooling step) are successively performed, the surface portion of the steel product is carbonitrided and quench-hardened.

EXAMPLES

Example 1

Influence by an average concentration of nitrogen and variation in nitrogen concentration in the surface portion on durability of the bearing component was initially investigated. Specifically, scratched contact fatigue life and life under clean lubrication were evaluated. A procedure for an experiment is as follows.

The test was conducted with the use of a deep-groove ball bearing (having an inner diameter of 30 mm, an outer diameter of 62 mm, and a width of 16 mm, and having 9 rolling elements) with a model number 6206 defined under JIS. Initially, an inner ring was fabricated through a procedure similar to that in the present embodiment (a carbonitriding temperature: 850° C., a tempering temperature: 240° C.). In the carbonitriding step, distribution of concentrations of nitrogen which had penetrated around the surface of the inner ring was controlled by adjusting a partial pressure of undecomposed ammonia, a partial pressure of hydrogen, a carbon activity, a heat treatment time period, and a quenching temperature. For comparison, an inner ring without being subjected to the nitrogen diffusion step after the carbonitriding step was also fabricated.

(Scratched Contact Fatigue Life Test)

A dent was formed by pressing a diamond cone indenter for measuring a Rockwell hardness against the center of a bottom portion of a groove in the raceway surface of the fabricated inner ring at a load of 196 N. Thirty dents per one inner ring were formed in the circumferential direction at equal intervals (that is, every central angle of 12°).

Then, a bearing was fabricated by combining the fabricated inner ring, the outer ring, the rolling element, and the cage. Then, a scratched contact fatigue life test was conducted on the fabricated bearing. A test machine having such a structure as applying a radial load equally to two bearings was adopted as a test machine. The test was conducted in such a manner that a load of approximately 3.04 GPa was applied to one bearing and the bearing was rotated at the number of revolutions of 3000 rpm. Lubrication was achieved by continuously feeding a constant amount of oil into a housing where a tested bearing is arranged.

(Life Test Under Clean Lubrication)

A bearing was fabricated by combining the fabricated inner ring, the outer ring, the rolling element, and the cage.

Here, a nitrogen concentration in the surface portion of the inner ring, the outer ring, and the rolling element was set to 0.4 mass %. Then, a life test under clean lubrication was conducted on the fabricated bearing. The test was conducted in such a manner that a load of approximately 3.04 GPa was applied to one bearing and the bearing was rotated at the number of revolutions of 2000 rpm. Lubrication was achieved by continuously feeding a constant amount of oil into a housing where a tested bearing is arranged.

Relation between the nitrogen concentration in the surface portion of the inner ring and life was investigated in the scratched contact fatigue life test. In the life test under clean lubrication, relation between variation in nitrogen concentration in the surface portion and life was also investigated in a case that a nitrogen concentration in the surface portion of the inner ring, the outer ring, and the rolling element was set to be constant (0.4 mass %). "Variation in nitrogen concentration in the surface portion" was determined with the method the same as in the embodiment above (see FIGS. 2 and 3).

Figure 9:
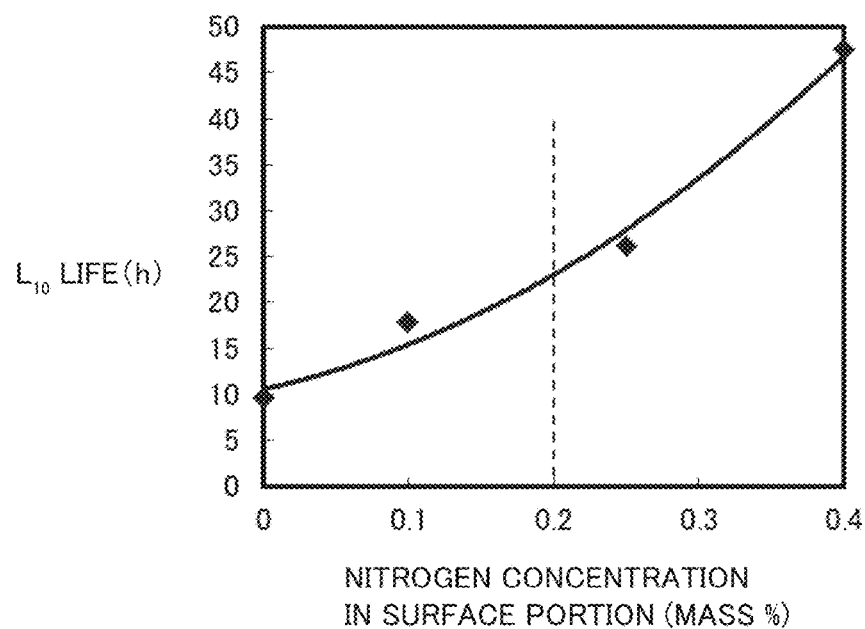
FIG. 9 is a graph showing relation between a nitrogen concentration in the surface portion and $L_{10}$ life in a scratched contact fatigue life test.
Figure 10:
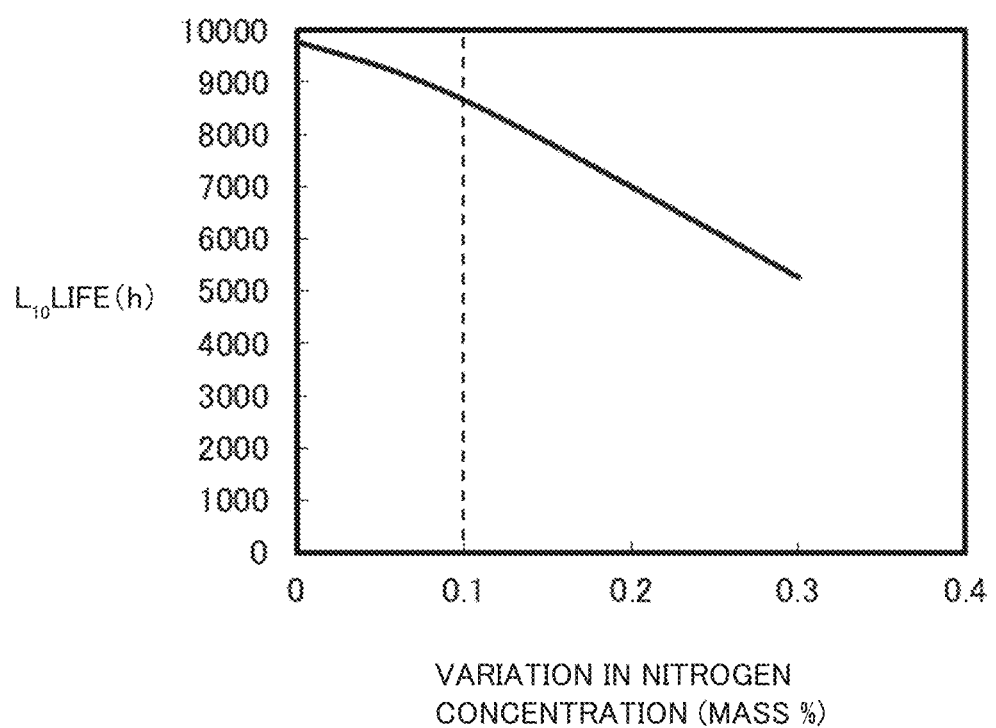
FIG. 10 is a graph showing relation between variation in nitrogen concentration in the surface portion and $L_{10}$ life in a life test under clean lubrication.

FIGS. 9 and 10 show results of the tests. FIG. 9 shows relation between the nitrogen concentration (abscissa, mass %) in the surface portion of the inner ring and $L_{10}$ life (ordinate, h) of scratched contact fatigue life. FIG. 10 shows relation between variation (abscissa, mass %) in nitrogen concentration in the surface portion of the inner ring and $L_{10}$ life (ordinate, h) of life.

As shown in FIG. 9, when the nitrogen concentration in the surface portion is lower than 0.2 mass % (shown with a dashed line in FIG. 9), $L_{10}$ life has decreased to ½ or less as compared with a case that the nitrogen concentration was 0.4 mass %. When nitrogen was introduced until the concentration exceeded 0.7 mass %, a hardness lowered to less than 650 HV and the test could not be conducted. This is because hardenability of the bearing lowered and an incompletely quenched structure was produced.

As shown in FIG. 10, when variation in nitrogen concentration was not higher than 0.1 mass % (shown with a dashed line in FIG. 10), $L_{10}$ life not shorter than a certain constant level was ensured, whereas when variation exceeded 0.1 mass %, $L_{10}$ life significantly became short. It was found from these results that it was effective to set the nitrogen concentration in the surface portion to 0.2 mass % or higher and 0.7 mass % or lower, that is, to set the average concentration of nitrogen in the surface portion to 0.3 mass % or higher and 0.6 mass % or lower and to set variation in nitrogen concentration in the surface portion to 0.1 mass % or lower, in order to suppress shorter scratched contact life and lowering in hardness of the contact surface.

Example 2

Relation between variation in nitrogen concentration in the surface portion and an inclination of the nitrogen concentration was then be investigated. The inner ring was fabricated initially by performing the steps (S10) to (S30) through the procedure the same as in the present embodiment (Example). A time period for the carbonitriding step was set to 4 hours and a time period for the nitrogen diffusion step was set to 1 hour. For comparison, an inner ring not subjected to the nitrogen diffusion step after the carbonitriding step was also fabricated (Comparative Example). Then, distribution of nitrogen concentrations around the surface layer of the inner ring fabricated before the finishing step (S40) was performed was investigated.

Figure 11:
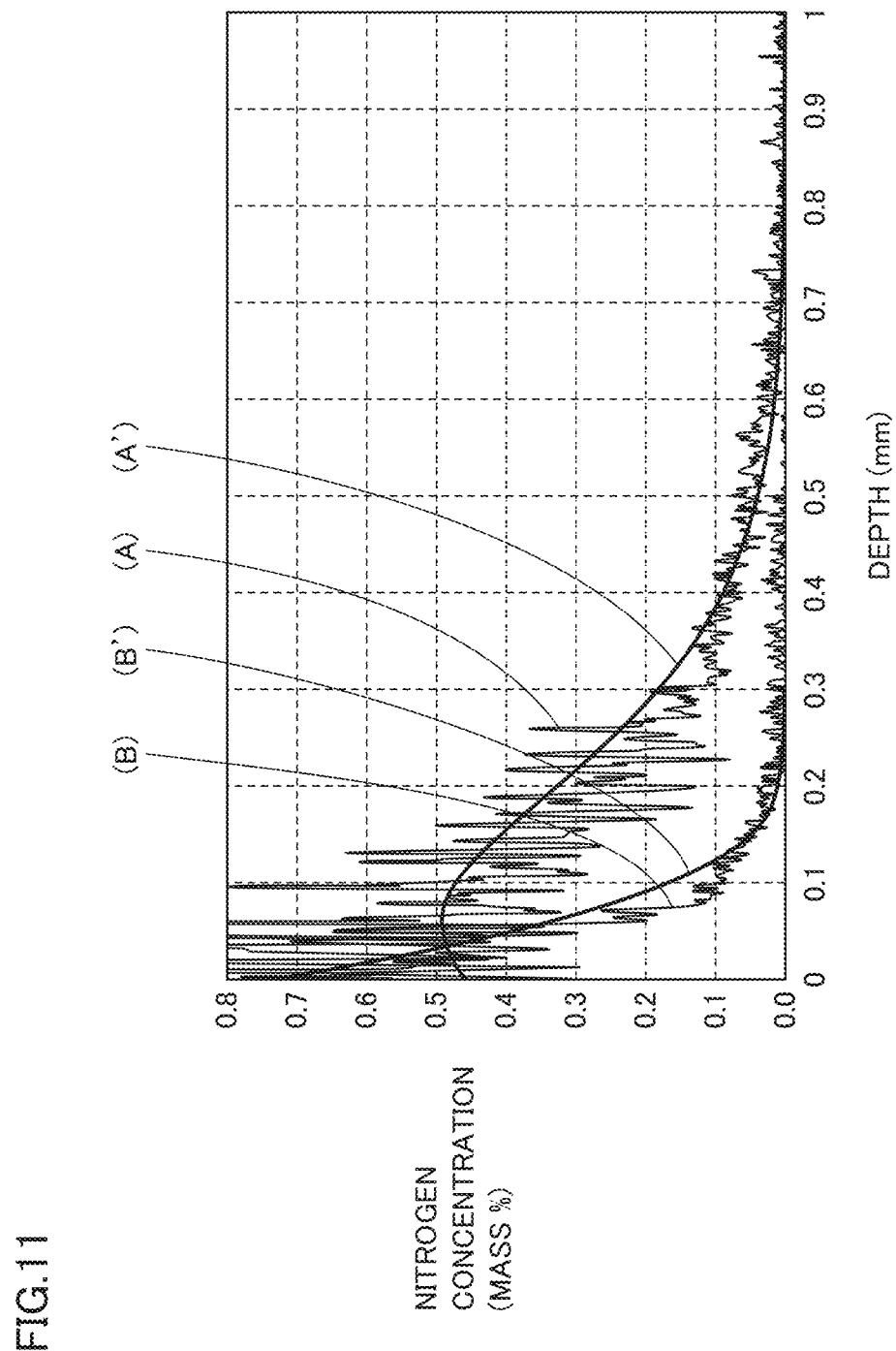
FIG. 11 is a graph showing distribution of nitrogen concentrations around a surface layer of an inner ring.

FIG. 11 shows distribution of nitrogen concentrations in a direction of depth of the fabricated inner ring. In FIG. 11, the abscissa represents a depth (mm) in the inner ring and the ordinate represents a nitrogen concentration (mass %). In FIG. 11, (A) represents results of measurement in Example, (A') represents an approximation curve of the results of measurement in Example, (B) represents results of measurement in Comparative Example, and (B') represents an approximation curve of the results of measurement in Comparative Example. For example, when an inclination of a nitrogen concentration is calculated at two depths where the nitrogen concentrations were 0.3 mass % and 0.1 mass %, respectively ((0.3−0.1)/distance (m)), the inclination of the nitrogen concentration was greater in Example than in Comparative Example (not less than −15 (l/m)). When the finishing step (S40) is performed such that the average concentration of nitrogen in the surface portion was 0.4 mass % with an amount of deformation of the inner ring in heat treatment being 0.2 mm, variation in nitrogen concentration in the surface portion was 0.25 mass % in Comparative Example, whereas variation was 0.08 mass % (not higher than 0.1 mass %) in Example. It was found from this result that it was effective to perform the nitrogen diffusion step after the carbonitriding step for lessening variation in nitrogen concentration in the surface portion after finishing.

Example 3

Then, influence by a carbonitride which exists in the surface portion on a static load capacity of the bearing component was investigated. In steel containing chromium (Cr), when nitrogen penetrates into steel through carbonitriding treatment or the like, a concentration of chromium in a base material lowers and a region of single-phase austenite extends and hence terminal solid solubility of carbon increases. Consequently, when carbonitriding treatment at a high concentration is performed without taking measures in particular, a carbonitride decreases or disappears in spite of absence of decarbonization. Here, from a point of view of higher strength of the bearing component, it seems preferable to allow a carbonitride to remain to thereby make use of a precipitation strengthening function of the carbonitride.

In the present embodiment, disappearance of a carbonitride is suppressed by setting a value for carbon activity $a_c^*$ in the carbonitriding step to 0.88 or higher and 1.27 or lower and to carry out carburization before increase in terminal solid solubility of carbon in a nitrogen-enriched layer. An experiment for confirming an effect of this remaining carbonitride was conducted.

Figure 12:
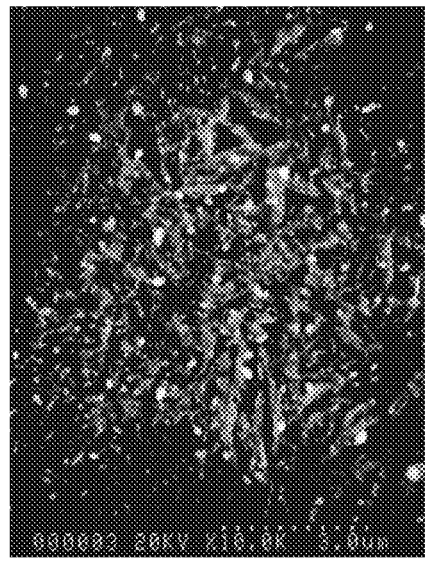
FIG. 12 shows a cross-sectional SEM photograph of a test specimen in a Comparative Example.
Figure 13:
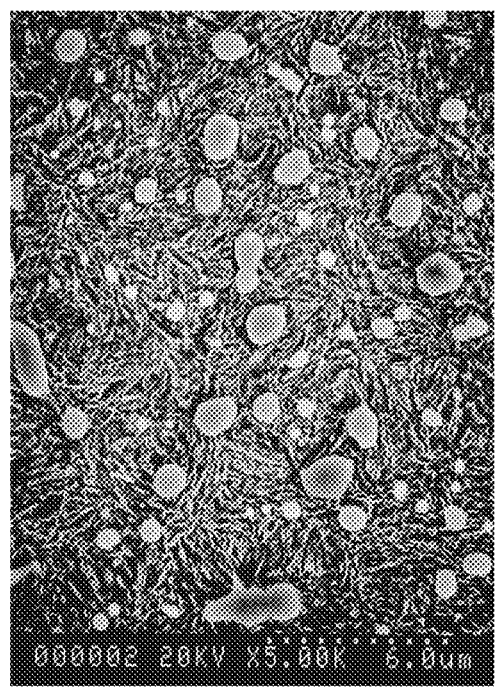
FIG. 13 shows a cross-sectional SEM photograph of a test specimen in an Example.

FIG. 12 shows a cross-sectional scanning electron microscope (SEM) photograph (at a magnification of 5000×) of a test specimen in carbonitriding with a conventional method and FIG. 13 shows a cross-sectional SEM photograph (at a magnification of 5000×) of a test specimen in a case that carbonitriding was carried out ($a_c^*$=1) through the procedure the same as in the present embodiment. The carbonitride almost disappeared in the photograph in FIG. 12, whereas at least five carbonitrides having a diameter not smaller than 0.3 μm and not greater than 0.5 μm were present per 100 μm² in the photograph in FIG. 13.

Figure 14:
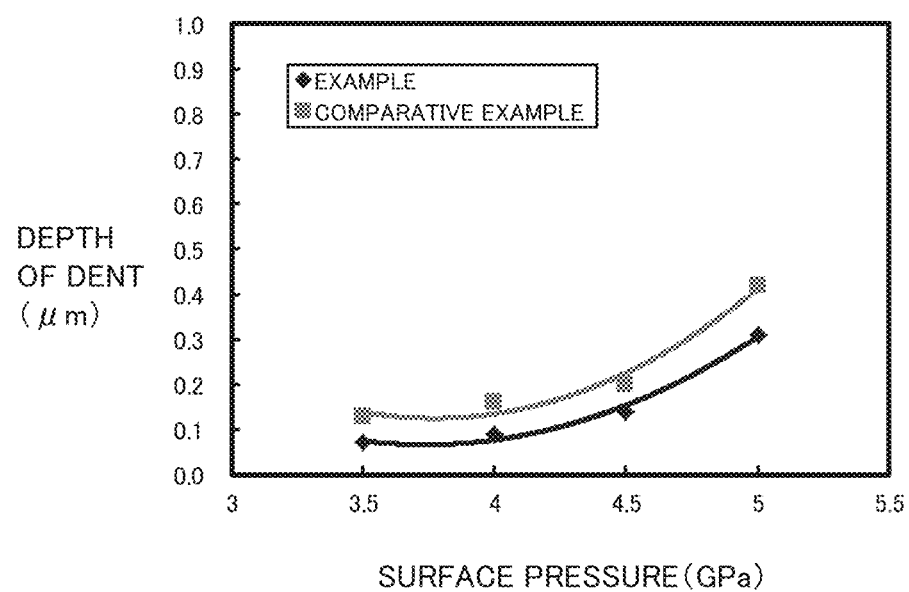
FIG. 14 is a graph showing influence by existence of a carbonitride on a depth of a dent.

Then, in order to confirm the effect of the carbonitride, an experiment in which a test specimen was subjected to carbonitriding treatment under different conditions, samples having a hardness of 750 HV were fabricated with an amount of existence (number density) of a carbide being varied, and a depth of a dent formed by pressing a ball made of silicon nitride having a diameter (φ) of 9.525 mm against a surface of the sample was measured was conducted. FIG. 14 shows results of the experiment. In FIG. 14, the abscissa represents a pressure (GPa) with which the ball made of silicon nitride was pressed and the ordinate represents a depth (μm) of the dent formed by pressing with the ball. In FIG. 14, a square mark represents a result of measurement of a sample (Comparative Example) in which the carbonitride disappeared and a rhombic mark represents a result of measurement of a sample (Example) in which five or more carbonitrides having a diameter not smaller than 0.3 μm and not greater than 0.5 μm were present per 100 μm².

As shown in FIG. 14, it was confirmed that a depth of the dent was smaller in the sample in which five or more carbonitrides having a diameter not smaller than 0.3 μm and not greater than 0.5 μm were present per 100 μm² than in the sample in which the carbonitride disappeared. It was found from this result that, in order to improve a static load capacity of the bearing component, it was effective that five or more carbonitrides having a diameter not smaller than 0.3 μm and not greater than 0.5 μm were present per 100 μm² in the surface portion.

Example 4

A method for determining a position of measurement of a cross-section hardness and a reference value for a difference in cross-section hardness for ensuring that a nitrogen concentration in the contact surface of the bearing component is not lower than 0.4 mass % will now be described.

(1) As to Test Specimen and Method of Experiment
(1-1) Introduction

Initially, a heating temperature and a retention time period in high-temperature tempering which highly correlate with a nitrogen concentration should be determined. Here, since transformation through high-temperature tempering is a process of thermal activation, increase in heating temperature and extension of the retention time period are the same in meaning, and it does not seem to be significant to define both of them as variables. Then, in the present Example, an optimal heating temperature was determined by searching for a heating temperature at which a difference in hardness is clearest, with the retention time period being fixed to be constant (1 hour) and with a heating temperature being varied among 300° C., 400° C., 500° C., 600° C., and 700° C.

A difference in hardenability owing to a difference in chemical component of each material or a difference in cooling rate during quenching may affect a hardness after quenching and also a hardness after high-temperature tempering. Therefore, in the present Example, an absolute value itself of a cross-section hardness is not employed, but a difference (difference in hardness) between a hardness at a deep position (a core portion) from an unnitrided surface layer (here, for example, a hardness at a depth of 1 mm from an outermost surface after heat treatment) and a hardness at a position at any depth in a nitrided region was adopted as an indicator. Namely, a chemical component of a material may be different among material lots, and a difference in hardness serves to offset such a difference.

(1-2) Test Specimen of Interest

Table 1 shows chemical components of a test specimen to be investigated. Materials were all within the range of components above, and were subjected to the carbonitriding treatment in various heat treatment furnaces and heat treatment atmospheres. A temperature for the carbonitriding treatment was included in a range not lower than 840° C. and not higher than 860° C.

TABLE 1

| Test Specimen No. | Chemical Component (Mass %) | | | | | | | |
|---|---|---|---|---|---|---|---|---|
| | C | Si | Mn | Ni | Cr | Mo | Cu | O* |
| 1 | 1.03 | 0.25 | 0.35 | 0.01 | 1.50 | 0 | 0.01 | 4 |
| 2 | Unknown | | | | | | | |
| 3 | 0.98 | 0.27 | 0.47 | 0.05 | 1.45 | 0.02 | 0.10 | 6 |
| 4 | 1.00 | 0.27 | 0.35 | 0.02 | 1.51 | 0 | 0.01 | 7 |
| 5 | 1.01 | 0.24 | 0.35 | 0.01 | 1.49 | 0 | 0.01 | 3 |
| 6 | 0.99 | 0.26 | 0.37 | 0.02 | 1.44 | 0 | 0.01 | 5 |
| 7 | Unknown | | | | | | | |
| 8 | 0.98 | 0.25 | 0.34 | 0.07 | 1.43 | 0.03 | 0.10 | 6 |
| 9 | 0.98 | 0.25 | 0.34 | 0.07 | 1.43 | 0.03 | 0.10 | 6 |
| 10 | 0.98 | 0.25 | 0.34 | 0.07 | 1.43 | 0.03 | 0.10 | 6 |

Specifically, a test specimen No. 1 was subjected to the carbonitriding treatment under such conditions that a treatment temperature was set to 850° C., a treatment time period was set to 120 minutes (min.) (hereinafter denoted, for example, as "850° C.×120 min."), an undecomposed ammonia fraction was set to 0.2 volume %, and a carbon activity was set to 0.9. A test specimen No. 2 was subjected to the carbonitriding treatment under such conditions as 840° C.×70 min., an undecomposed ammonia fraction of 0.1 volume %, and a carbon activity of 0.85. A test specimen No. 3 was subjected to the carbonitriding treatment under such conditions as 850° C.×120 min., an undecomposed ammonia fraction of 0.1 volume %, and a carbon activity of 0.9. A test specimen No. 4 was subjected to the carbonitriding treatment under such conditions as 850° C.×90 min., an undecomposed ammonia fraction of 0.1 volume %, and a carbon activity of 0.9. A test specimen No. 5 was subjected to the carbonitriding treatment under such conditions as 850° C.×90 min., an undecomposed ammonia fraction of 0.1 volume %, and a carbon activity of 0.9.

A test specimen No. 6 was subjected to the carbonitriding treatment under such conditions as 850° C.×90 min., an undecomposed ammonia fraction of 0.13 volume %, and a carbon activity of 0.9. A test specimen No. 7 was subjected to the carbonitriding treatment under such conditions as 850° C.×150 min., an undecomposed ammonia fraction of 0.1 volume %, and a carbon activity of 0.85. A test specimen No. 8 was subjected to the carbonitriding treatment under such conditions as 850° C.×150 min., an undecomposed ammonia fraction of 0.25 volume %, and a carbon activity of 0.9. A test specimen No. 9 was subjected to the carbonitriding treatment under such conditions as 850° C.×180 min., an undecomposed ammonia fraction of 0.3 volume %, and a carbon activity of 0.95. A test specimen No. 10 was subjected to the carbonitriding treatment under such conditions as 850° C.×90 min., an undecomposed ammonia fraction of 0.2 volume %, and a carbon activity of 0.9.

(1-3) Method of Measuring Nitrogen Concentration

In order to investigate correlation between a cross-section hardness and a nitrogen concentration of the sample subjected to high-temperature tempering, distribution of nitrogen concentrations in the sample (steel) should be measured. EPMA line analysis was employed for measurement of a nitrogen concentration in steel subjected to the carbonitriding treatment. Quantification was carried out by analyzing a calibration test specimen having an already-known nitrogen concentration and using a calibration curve thereof. A schematic diagram of a sample and a measurement method used in electron probe micro analysis (EPMA) are as shown in FIG. 15.

Figure 15:
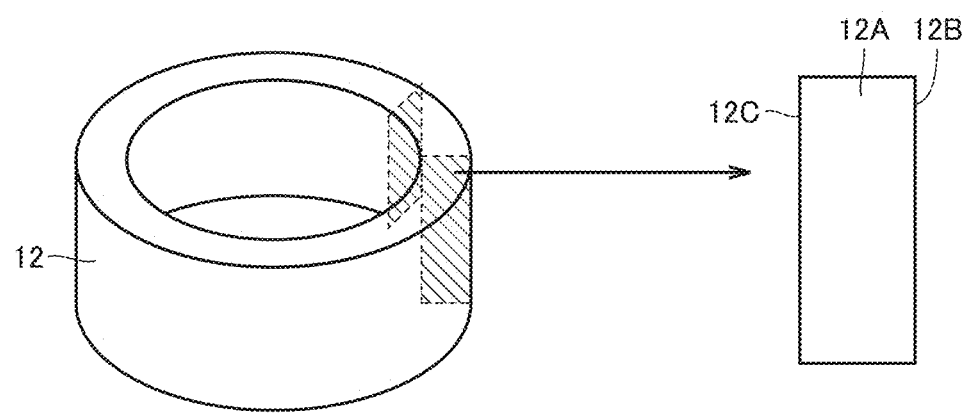
FIG. 15 is a schematic diagram for illustrating a method of measuring a nitrogen concentration in a sample.

For example, a case that inner ring 12 is employed as the sample as shown in FIG. 15 will be discussed. A nitrogen concentration of the sample after the carbonitriding treatment was measured. Specifically, a test specimen 12A as shown in FIG. 15 was cut from the sample, and a cut end surface at a central portion in a direction of height of test specimen 12A (a portion at a half width) was subjected to EPMA line analysis along a direction from an outer circumferential surface 12B of the test specimen toward inner circumferential surface 12C.

(1-4) Method of Measuring Cross-Section Hardness

In test specimen 12A described in (1-3), a hardness was measured at the cut end surface for which EPMA analysis was conducted. For measurement, a Vickers hardness was measured with a microvickers hardness tester.

(2) Search for Retention Temperature in High-Temperature Tempering (2-1) Contents of Experiment In order to search for a tempering temperature (heating temperature) which highly correlates with a nitrogen concentration, test specimen 12A tempered at a heating temperature of 180° C. for a retention time period of 2 hours after the carbonitriding treatment was subjected to five types of high-temperature tempering in which heating temperatures of 300° C., 400° C., 500° C., 600° C., and 700° C. were set, respectively, and the retention time period was set to 1 hour. An air atmosphere was adopted as an atmosphere during high-temperature tempering. Then, a cross-section hardness of the test specimen treated under each high-temperature tempering condition was measured. Here, test specimens having Nos. 8 and 9 under conditions for the carbonitriding treatment which seem to be large in an amount of penetration of nitrogen were subjected to measurement.

(2-2) Results of Experiment

Figure 16:
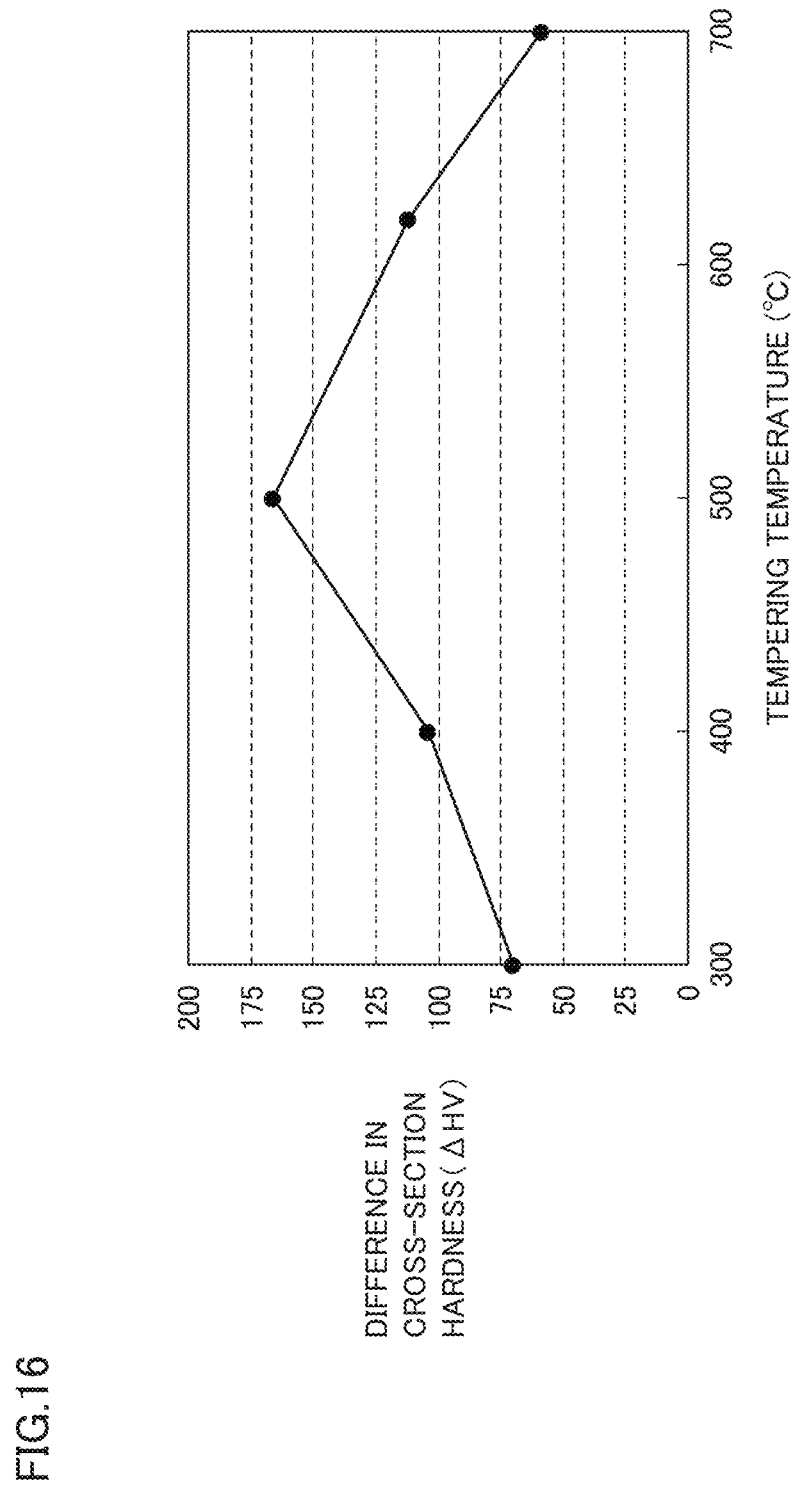
FIG. 16 is a graph showing relation between a tempering temperature and a difference in cross-section hardness.

FIG. 16 shows a graph summarizing results of the experiment. The graph shown in FIG. 16 summarizes the results of the experiment with the abscissa representing a tempering temperature (° C.) and the ordinate representing a difference in cross-section hardness (that is, (a maximum value for the cross-section hardness)−(a cross-section hardness at a position at a depth of 1 mm from the outermost surface after heat treatment): also denoted as $\Delta HV$). As can be seen in FIG. 16, difference in cross-section hardness $\Delta HV$ was greatest under high-temperature tempering in which the heating temperature was set to 500° C. and the retention time period was set to 1 hour. Difference in cross-section hardness $\Delta HV$ at the time when this heating temperature was set to 500° C. exhibited a value approximately twice as high as difference in cross-section hardness $\Delta HV$ after high-temperature tempering in which the heating temperature was set to 300° C. or 700° C. Therefore, a hardness after tempering which relatively highly correlates with a nitrogen concentration seems to be a hardness after tempering in which the heating temperature was set to around 500° C. Therefore, in an experiment below, a cross-section hardness of a test specimen subjected to high-temperature tempering in which the heating temperature was set to 500° C. and the retention time period was set to 1 hour was measured.

(3) Investigation of Relation Between Nitrogen Concentration and Difference in Cross-Section Hardness ($\Delta HV$)

Figure 17:
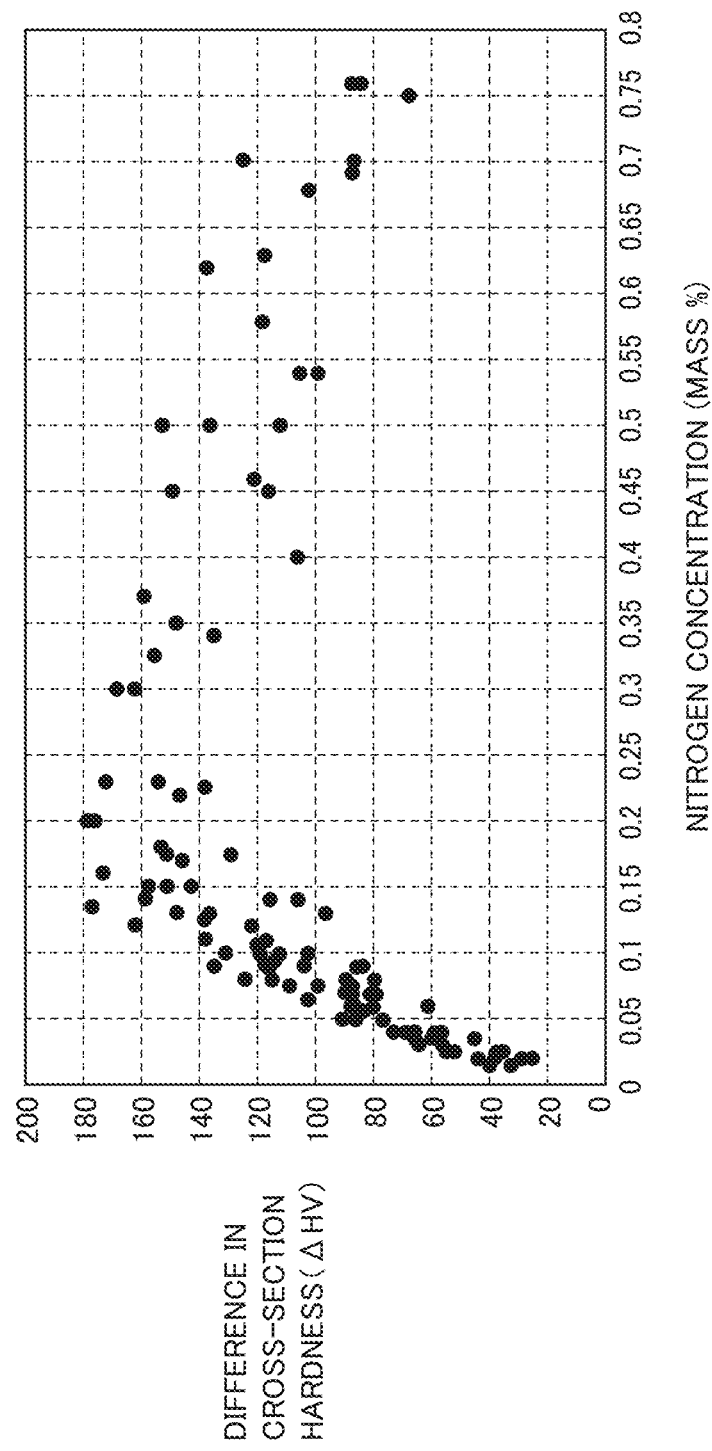
FIG. 17 is a graph showing relation between a nitrogen concentration and a difference in cross-section hardness.
Figure 18:
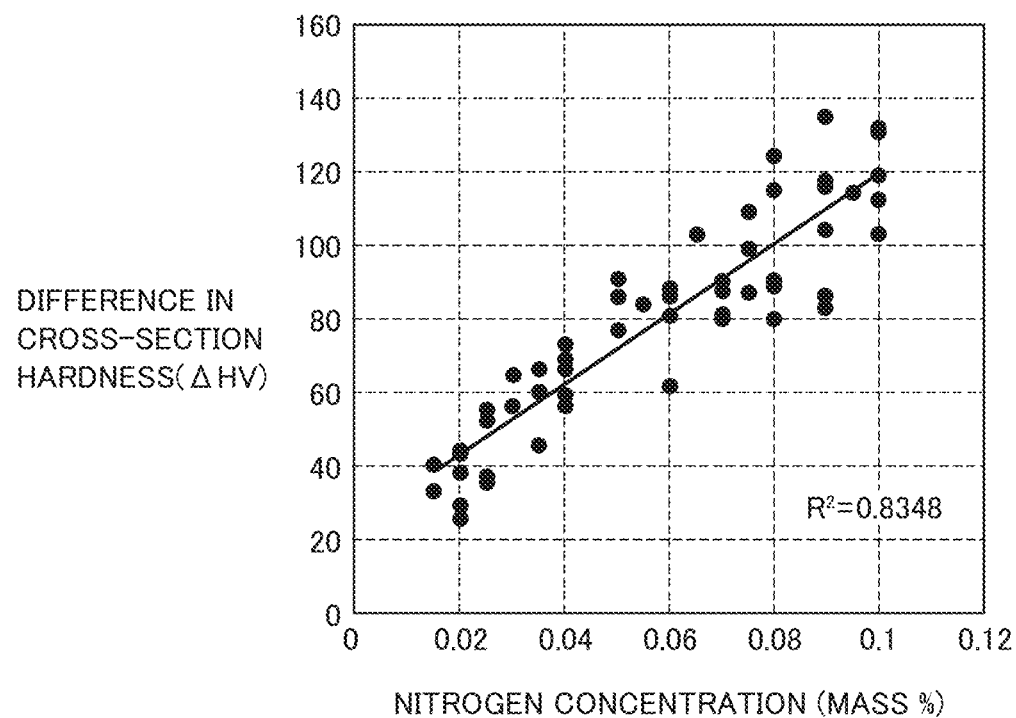
FIG. 18 is a graph showing relation between a nitrogen concentration in a range where a nitrogen concentration is not higher than 0.1 mass % and a difference in cross-section hardness.

Here, each test specimen having a composition shown in Table 1 was subjected to the carbonitriding treatment, a heat treatment in which the heating temperature was set to 500° C. and the retention time period was set to 1 hour was carried out as high-temperature tempering, and thereafter a nitrogen concentration in test specimen 12A was measured through EPMA analysis as described with reference to FIG. 15. The carbonitriding treatment was carried out under such a condition that a heating temperature was set to 850° C. and a value for carbon activity/undecomposed ammonia fraction ($\gamma$) was 4.75. A cross-section hardness of test specimen 12A was measured in a direction of depth at the cut end surface shown in FIG. 15. Then, relation of a difference between a cross-section hardness at a certain position in the direction of depth and a cross-section hardness at a position at a depth of 1 (mm) from the outermost surface after heat treatment (difference in cross-section hardness ($\Delta HV$)) was investigated. FIGS. 17 and 18 show results.

In FIGS. 17 and 18, the abscissa represents a nitrogen concentration (mass %) and the ordinate represents a difference in cross-section hardness ($\Delta HV$) (the unit being a Vickers hardness). FIG. 18 shows extraction of relation between a nitrogen concentration and a difference in cross-section hardness in the range of a nitrogen concentration from 0 to 0.1 mass % from FIG. 17. It was found from FIG. 17 that correlation between the nitrogen concentration and the difference in cross-section hardness was strong in a range of the nitrogen concentration exceeding 0 and not higher than 0.1 mass %, whereas correlation between the nitrogen concentration and the difference in cross-section hardness was relatively weak in a range of the nitrogen concentration exceeding 0.1 mass %. This may be because incomplete quenching may occur in a region high in nitrogen concentration and because nitrogen in a solid solution state in the test specimen does not necessarily contribute to lowering in rate of decomposition of martensite. In FIG. 18, when a coefficient of correlation between the nitrogen concentration and the difference in cross-section hardness is calculated in the range of the nitrogen concentration exceeding 0 and not higher than 0.1 mass %, the coefficient of correlation therebetween is as high as 0.8348. Therefore, it is expected that a nitrogen concentration can be estimated from a difference in cross-section hardness if the nitrogen concentration is in the range from 0 to 0.1 mass %. Therefore, in an experiment below, relation between the nitrogen concentration of 0.06 mass and the difference in cross-section hardness of 80 $\Delta HV$ at a position substantially intermediate in a region in which the nitrogen concentration and the difference in cross-section hardness have positive correlation (from 0 to 0.1 mass %) is employed.

(4) Relation Between Time Period for Carbonitriding Treatment and Distribution of Nitrogen Concentrations A constituent element of a rolling bearing is ground after quenching and tempering, for shaping thereof. Therefore, when the carbonitriding treatment is performed under a constant treatment condition, a nitrogen concentration in the outermost surface (the raceway surface or the rolling contact surface) of a product will vary depending on grinding allowance. Therefore, in order to keep the nitrogen concentration in the outermost surface of the product at 0.4 mass % or higher, a condition for the carbonitriding treatment should be varied based on grinding allowance on one side.

Figure 19:
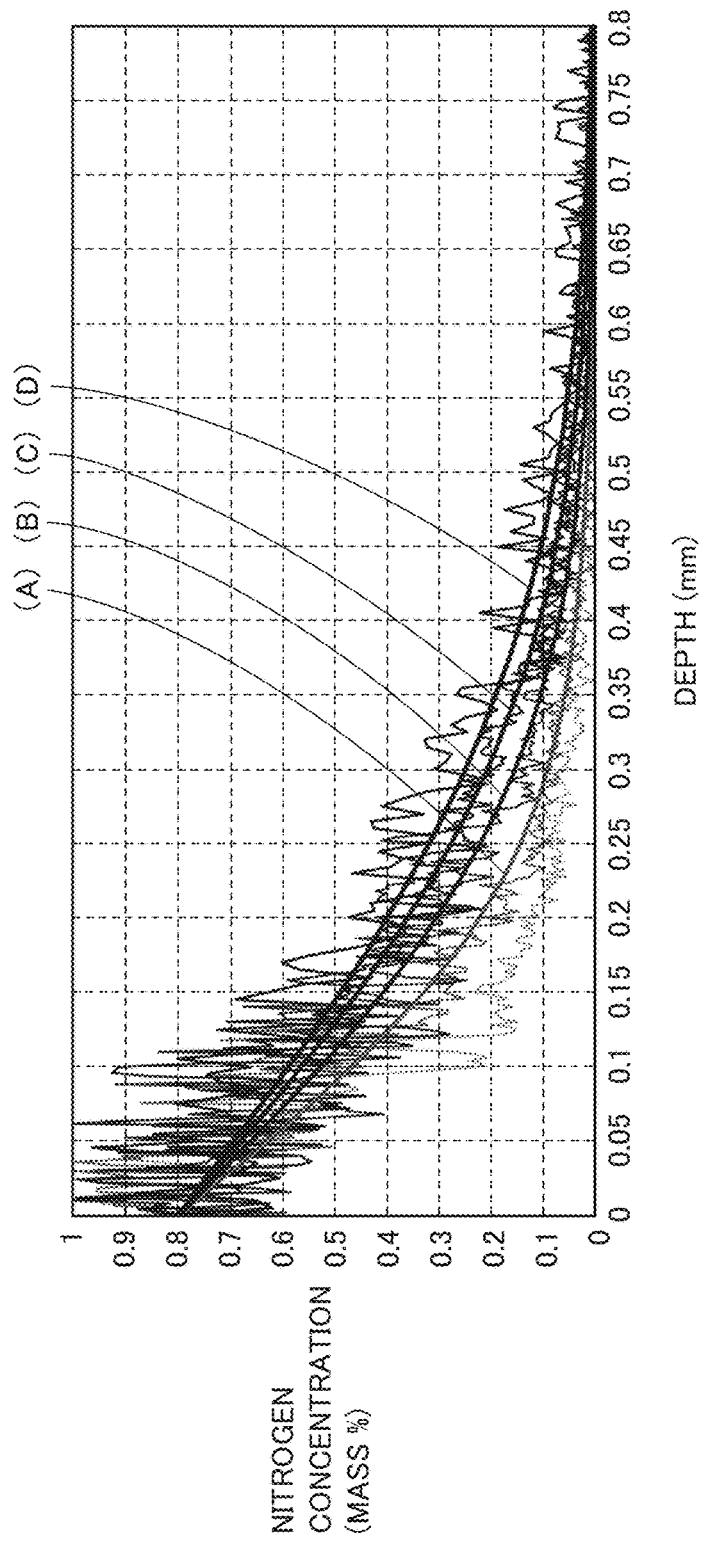
FIG. 19 is a graph showing distribution of nitrogen concentrations in steel after carbonitriding treatment.

FIG. 19 shows distribution of nitrogen concentrations (before high-temperature tempering) in a case that the steel product in the range of components above was subjected to the carbonitriding treatment with a heating temperature being set to 850° C., a value for carbon activity/undecomposed ammonia fraction ($\gamma$) being set to 4.75, and treatment time periods being set to 4 hours ((A) in the figure), 6 hours ((B) in the figure), 8 hours ((C) in the figure), and 10 hours ((D) in the figure). The abscissa in FIG. 19 represents a depth (mm) from the surface and the ordinate represents a nitrogen concentration (mass %). Here, if the carbonitriding treatment is performed under such a condition that a value for γ is greater than 5, an amount of penetration of nitrogen will lower and a region where a nitrogen concentration is high will be closer toward the surface. Consequently, with a method other than a method of setting a treatment time period to be very long, it becomes virtually difficult to set a nitrogen concentration in the surface of the product to 0.4 mass % or higher. When a temperature for the carbonitriding treatment is not lower than 860° C., it is difficult to keep a value for γ at 5 or smaller, and when a temperature for the carbonitriding treatment is not higher than 840° C., a rate of diffusion of nitrogen into the steel is low and consequently the time period for treatment is longer. Therefore, a temperature around 850° C. is appropriate for the carbonitriding treatment of the steel product. A heating temperature during the carbonitriding treatment can be determined based on a size of a crystal grain of quenched prior austenite, and when the heating temperature is set to 850° C., a size of a crystal grain of prior austenite in the steel product is within a range from No. 9 to No. 11 defined under JIS.

It was found from FIG. 19 that a nitrogen concentration in the outermost surface of the product could be not lower than 0.4 mass % by setting a time period for the carbonitriding treatment to 4 hours when a grinding allowance on one side of the outermost surface of the product was 0.125 (mm), setting a time period for the carbonitriding treatment to 6 hours when grinding allowance was 0.15 (mm), setting a time period for the carbonitriding treatment to 8 hours when grinding allowance was 0.175 (mm), and setting a time period for the carbonitriding treatment to 10 hours when grinding allowance was 0.2 (mm).

Figure 20:
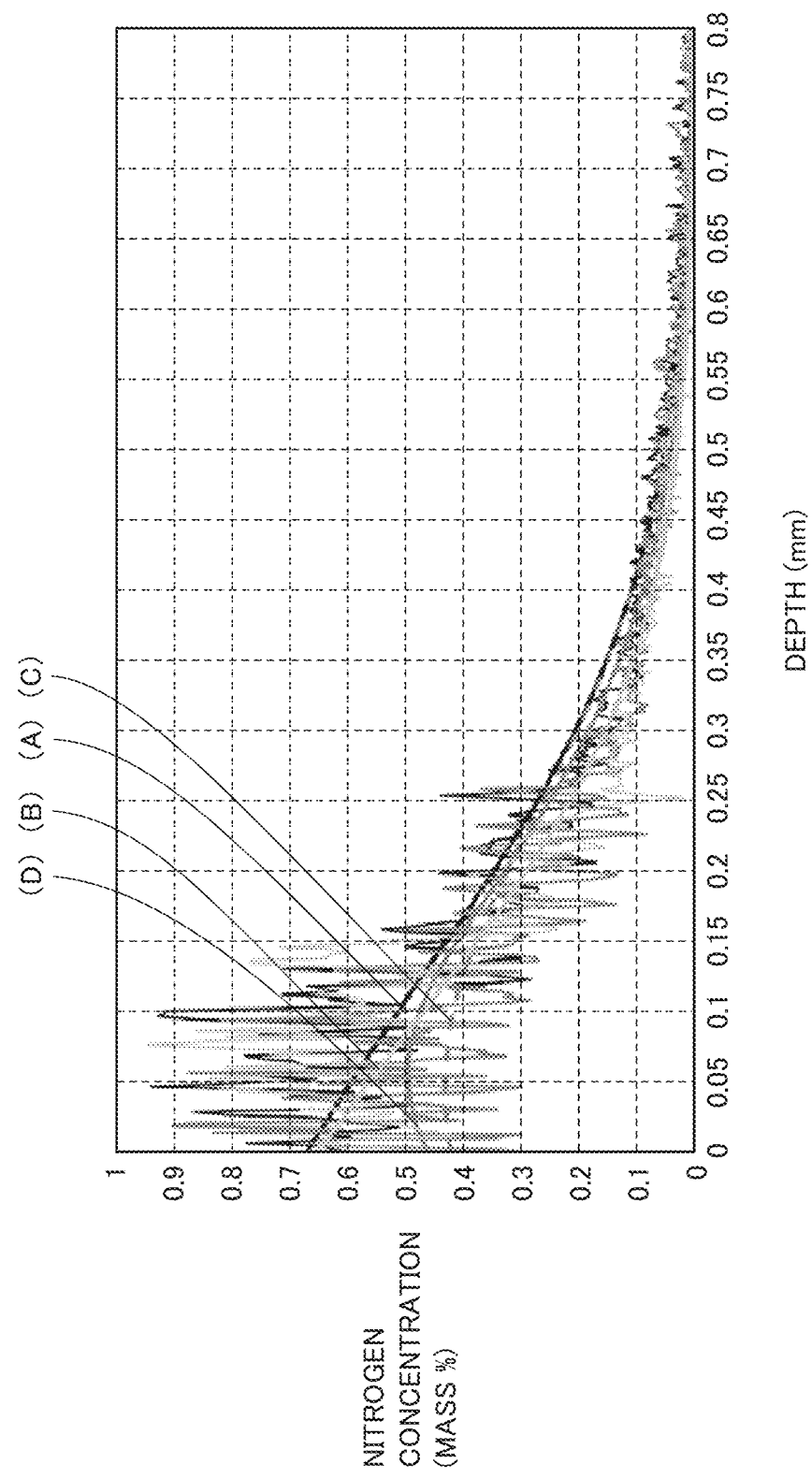
FIG. 20 is a graph showing distribution of nitrogen concentrations in steel after nitrogen diffusion treatment.

(5) Relation Between Nitrogen Diffusion Treatment and Distribution of Nitrogen Concentrations It is effective to perform the nitrogen diffusion treatment after the carbonitriding treatment in order to prevent production of an incompletely quenched structure or lowering in hardness due to an excessive amount of retained austenite. FIG. 20 shows distribution of nitrogen concentrations in steel subjected to the nitrogen diffusion treatment (a measured value and a calculated value). In FIG. 20, the abscissa represents a depth (mm) from the surface and the ordinate represents a nitrogen concentration (mass %). In FIG. 20, (A) represents a calculated value when a time period for the carbonitriding treatment was set to 6 hours and a time period for the nitrogen diffusion treatment was set to 2 hours (a concentration of undecomposed $NH_3$ was 0.1 volume %), (B) represents a calculated value when a time period for the carbonitriding treatment was set to 6 hours and a time period for the nitrogen diffusion treatment was set to 1 hour (a concentration of undecomposed $NH_3$ was 0.05 volume %), (C) represents a calculated value when a time period of the carbonitriding treatment was set to 6 hours and a time period for the nitrogen diffusion treatment was set to 2 hours (a concentration of undecomposed $NH_3$ was 0.05 volume %), and (D) represents a calculated value when a time period for the carbonitriding treatment was set to 4 hours and a time period for the nitrogen diffusion treatment was set to 2 hours (a concentration of undecomposed $NH_3$ was 0.1 volume %). These calculated values were obtained by setting a coefficient of diffusion of nitrogen to $1.2 \times 10^{-6}$ (m²/s). The calculated values shown in (A) to (D) substantially matched with actually measured values.

Then, FEM analysis in which a time period for the carbonitriding treatment and a time period for the nitrogen diffusion treatment were varied was conducted (a time period for the carbonitriding treatment: 4, 5, 6, 7, 8, 9, and 10 hours, a time period for the nitrogen diffusion treatment: 1 hour and 2 hours), and distribution of nitrogen concentrations under each treatment condition was calculated. Then, a regression expression with a result of calculation being defined as an objective variable was calculated. In addition, in consideration of diffusion of nitrogen by 0.03 mm into the inside as a result of high-temperature tempering (heating temperature: 500° C., retention time period: 1 hour) and grinding allowance (0.1 to 0.2 mm) in finishing after heat treatment, expressions (3) and (4) below for determining a position of measurement of a difference in cross-section hardness after high-temperature tempering were constructed. The expression (3) below shows a position ($x_1$) of measurement of a cross-section hardness for ensuring that a nitrogen concentration in the outermost surface of the product is not lower than 0.4 mass %, and the expression (4) shows a position ($x_2$) of measurement of a cross-section hardness for ensuring that a nitrogen concentration in the outermost surface of the product is not lower than 0.3 mass %. In this case, calculation was made with a heating temperature in the nitrogen diffusion treatment being set to 850° C., a concentration of undecomposed $NH_3$ being set to 0.06 volume %, and a carbon activity being set to 0.9.

$$x = 0.17935 + 0.01895 \times T_1 + 0.06125 \times T_2 - 1.45 \times 10^{-17} \times T_1^2 + 0.012 \times T_2^2 - 0.00625 \times T_1 \times T_2 \qquad (3)$$

x: position (mm) of measurement of cross-section hardness, $T_1$: time period (h) for carbonitriding treatment, $T_2$: time period (h) for nitrogen diffusion treatment $$x = 0.158233 + 0.014567 \times T_1 + 0.0284 \times T_2 - 4.2 \times 10^{-18} \times T_1^2 + 0.0036 \times T_2^2 - 0.0021 \times T_1 \times T_2 \qquad (4)$$

x: position (mm) of measurement of cross-section hardness, $T_1$: time period (h) for carbonitriding treatment, $T_2$: time period (h) for nitrogen diffusion treatment (6) Procedure in Quality Assurance Based on results of the discussions in (1) to (5), a procedure for ensuring that a nitrogen concentration in the outermost surface of the product after heat treatment is not lower than 0.4 mass % is as follows. Initially, time period $T_1$ (h) for the carbonitriding treatment and time period $T_2$ (h) for the nitrogen diffusion treatment are substituted into the expression (3) to thereby calculate position $x_1$ (mm) of measurement of a cross-section hardness after high-temperature tempering. Then, high-temperature tempering is carried out with a heating temperature being set to 500° C. and a retention time period being set to 1 hour. Then, a test specimen is cut from the product subjected to high-temperature tempering, a cross-section hardness at calculated position $x_1$ (mm) of measurement and in the unnitrided inside is measured, and a difference in cross-section hardness is calculated based on a difference between measured values. Then, whether or not a difference in cross-section hardness is 80 ΔHV or more is determined. Thus, it can be ensured that a nitrogen concentration in the outermost surface of the ground product is not lower than 0.4 mass % when the difference in cross-section hardness is 80 ΔHV or more.

When time period $T_1$ for the carbonitriding treatment is set to 6 hours and time period $T_2$ for the nitrogen diffusion treatment is set to 2 hours, it can be ensured based on the expression (3) that a nitrogen concentration in the outermost surface of the product is not lower than 0.4 mass % when a difference in cross-section hardness at a position at a depth of 0.4 mm is 80 ΔHV or more. When time period $T_1$ for the carbonitriding treatment is shorter than 6 hours and time period $T_2$ for the nitrogen diffusion treatment is shorter than 2 hours as well, similarly, evaluation can be made based on a difference in cross-section hardness at a position at a depth of 0.4 mm.

Example 7

An experiment as follows was conducted for the purpose of obtaining a bearing component which is inexpensive and has improved yield strength and life. Initially, a steel product within the range of components above was prepared, and the steel product was successively carbonitrided, quenched, and tempered, and thereafter ground and finished, to thereby manufacture a bearing component. Then, a test below was conducted with a nitrogen concentration in the surface portion and a tempering temperature being varied.

An atmosphere during the carbonitriding treatment had a value for γ of 4.75 and a heating temperature of 850° C. When a value for γ is greater than 5, a rate of penetration of nitrogen lowers, a region where a nitrogen concentration is high tends to remain in the surface layer, and a time period for the carbonitriding treatment becomes very long in consideration of allowance in grinding, which is not practical. When a steel product within the range of components above is employed, at a temperature significantly higher than 850° C., a large amount of ammonia is required in order to keep a high undecomposed ammonia fraction, which results in high cost for a process. When a temperature is significantly lower than 850° C., a rate of diffusion of nitrogen into steel is low, which results in a longer treatment time period. Therefore, a temperature around 850° C. can be concluded as appropriate in the carbonitriding treatment of the steel product.

(1) Relation of Nitrogen Concentration in Surface Portion and Tempering Temperature with Depth of Remaining Dent Initially, influence by a nitrogen concentration in a surface portion and a tempering temperature on a depth of a remaining dent was investigated. Initially, flat test specimens were fabricated with a nitrogen concentration in the surface portion and a tempering temperature being varied. Specifically, test specimens in which nitrogen concentrations were 0 mass %, 0.1 mass %, 0.25 mass %, and 0.4 mass %, respectively were prepared, and the respective test specimens were tempered at temperatures of 180° C., 210° C., 240° C., and 260° C. Then, a ceramic ball (having a size of ⅜ inch) was pressed against a flat surface of the test specimen at a load at which a maximum contact pressure was 4.5 GPa (with a perfect elastic body being assumed) and a depth of a remaining dent after the load was removed was investigated. A value of 4.5 GPa is substantially the same as the maximum value for the maximum contact pressure applied to a rolling bearing available on the market.

Figure 21:
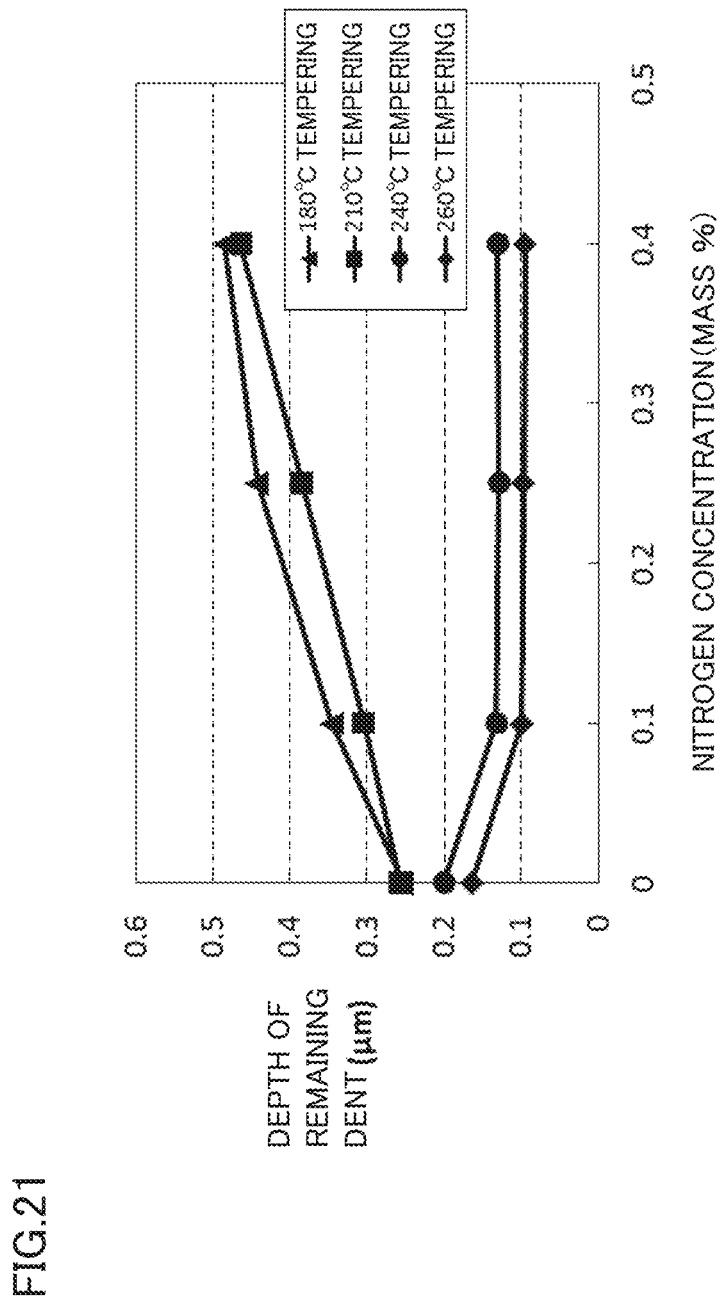
FIG. 21 is a diagram showing relation of a nitrogen concentration and a tempering temperature with a depth of a remaining dent.

FIG. 21 shows results of investigation of relation of a nitrogen concentration in the surface portion and a tempering temperature with a depth of a remaining dent. In FIG. 21, the abscissa represents a nitrogen concentration (mass %) and the ordinate represents a depth (μm) of a remaining dent. As is clear from FIG. 21, a depth of a remaining dent was significantly smaller in a case that a tempering temperature was set to 240° C. and 260° C. than in a case that a tempering temperature was set to 180° C. and 210° C. When a tempering temperature was set to 180° C. and 210° C., a depth of a remaining dent was greater as a nitrogen concentration was higher, whereas when a tempering temperature was set to 240° C. and 260° C., a depth of a remaining dent was conversely smaller as a nitrogen concentration was higher (less likely to plastically deform). It was found from this result that, in the range of the experiment above (a tempering temperature being not lower than 180° C. and not higher than 260° C.), with increase in tempering temperature, yield strength was higher and a higher static load capacity was obtained in the steel product containing nitrogen.

(2) Relation Between Nitrogen Concentration in Surface Portion and Scratched Contact Fatigue Life Then, relation between a nitrogen concentration in the surface portion and scratched contact fatigue life in high-temperature tempering (240° C., 260° C.) was investigated. Initially, a test specimen worked into a shape of an inner ring of a ball bearing (a bearing model number: 6206) was fabricated. Then, artificial dents were formed equiangularly at 6° at the bottom of a groove in the raceway surface of the test specimen, and a rolling fatigue test was conducted. The artificial dents were formed by applying a load with a Rockwell indenter at a load of 196 N. In the rolling fatigue test, a maximum contact pressure was set to 3.2 GPa, the number of revolutions of the inner ring was set to 3000 rpm, and circulating oiling of turbine oil VG56 as a lubricating oil was provided.

Figure 22:
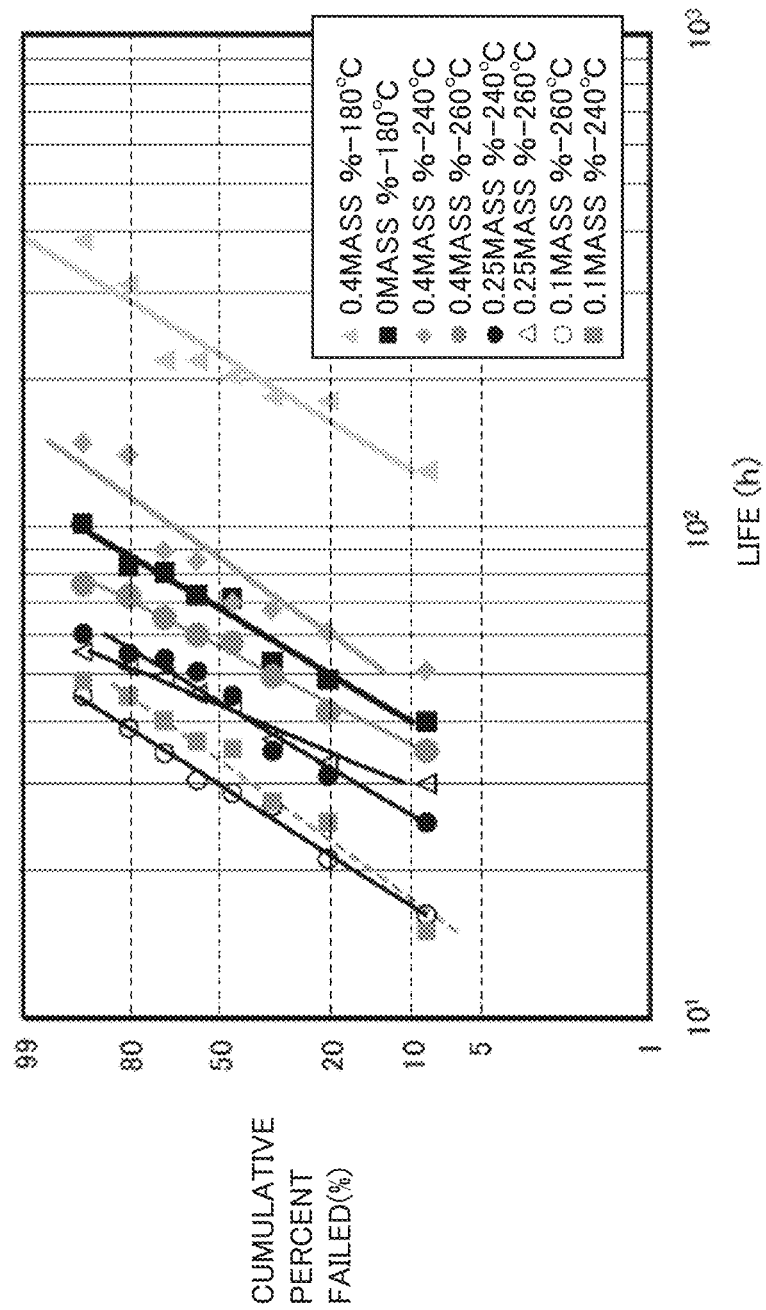
FIG. 22 is a diagram showing a Weibull plot of scratched contact fatigue life.

FIG. 22 shows results of investigation of relation between a nitrogen concentration in the surface portion and scratched contact fatigue life. FIG. 22 shows a Weibull plot of scratched contact fatigue life, in which the abscissa represents life (h) and the ordinate represents a cumulative percent failed (%). In FIG. 22, a nitrogen concentration and a tempering temperature are denoted as a "nitrogen concentration-tempering temperature." For example, a denotation "0.4 mass %-240° C." means that a nitrogen concentration was set to 0.4 mass % and a tempering temperature was set to 240° C. For the reference purpose, a result in a case that a nitrogen concentration was set to 0.4 mass % and a tempering temperature was set to 180° C. is also shown. As is clear from FIG. 22, when a nitrogen concentration was set to 0.4 mass % and a tempering temperature was set to 240° C., a result substantially the same as in a case that a nitrogen concentration was set to 0 mass % and a tempering temperature was set to 180° C. was obtained. With decrease in nitrogen concentration, however, scratched contact fatigue life was shorter. Therefore, it was found that, in order to achieve both of improvement in yield strength and longer life, a tempering temperature should be high (240° C., 260° C.) and a nitrogen concentration in the surface portion should be 0.4 mass % or higher as described above.

(3) Relation of Nitrogen Concentration in Surface Portion and Tempering Temperature with Hydrogen Embrittlement Flaking Life Then, influence by a nitrogen concentration in the surface portion and a tempering temperature on resistance to hydrogen under rolling fatigue was investigated. Here, a source of hydrogen under rolling fatigue is a lubricant itself or water introduced into a lubricant, and it is considered that such a source is decomposed to generate hydrogen due to slipping which takes place between contact elements and some of hydrogen penetrates into steel.

Figure 23:
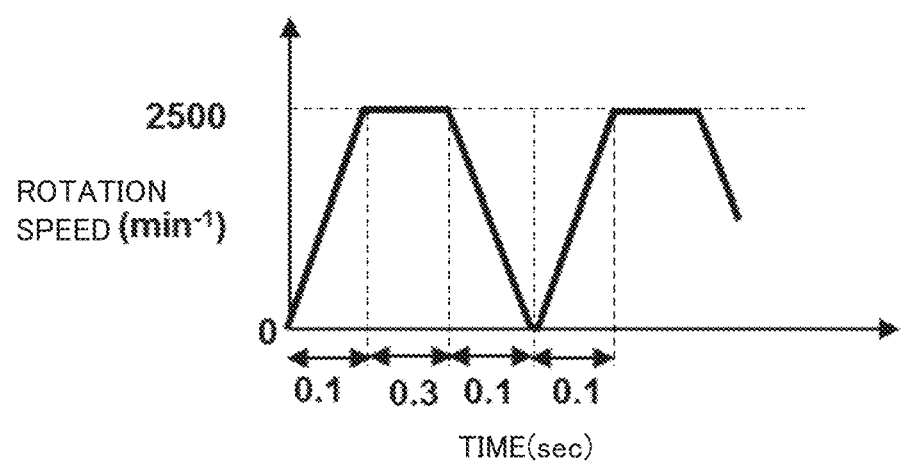
FIG. 23 is a diagram showing a quick acceleration and deceleration pattern in a hydrogen-resistance life test.

A rolling bearing ring of a thrust bearing (bearing model number: 51106) was employed as a test specimen for conducting a rolling fatigue test. A quick acceleration and deceleration pattern shown in FIG. 23 was employed as an operation pattern. In FIG. 23, the abscissa represents time (sec) and the ordinate represents a rotation speed ($min^{-1}$). As shown in FIG. 23, a rotation speed was increased to a rotation speed of 2500 $min^{-1}$ in 0 to 0.1 sec., the rotation speed was maintained thereafter for 0.3 sec., and the rotation speed was decreased to 0 $min^{-1}$ in 0.1 sec. The test was conducted by repeating this cycle. A ball made of SUS440C was employed as the ball and the number of balls was decreased from 17 (standard number) to 12. A cage made of a resin for 12-equidistant arrangement was fabricated as a cage, and a maximum contact pressure was set to 2.3 GPa. Water-soluble polyglycol oil was employed as a lubricating oil and pure water as a source of hydrogen was mixed therein (a concentration of pure water being 40 mass %). A test machine was set to automatically stop when flaking occurred in a rolling bearing ring and vibration was great.

Here, it has been confirmed in advance that influence by pure water representing a source of hydrogen on life (hydrogen-resistance life) does not vary at a concentration of pure water not lower than 20 mass %. A ratio of pure water in the lubricating oil slightly lowers after the test. Therefore, validity as evaluation of resistance to hydrogen in the experiment is guaranteed by measuring a ratio of mixing of pure water after the test and confirming that the ratio is not lower than 20 mass %. Pure water around 35 mass % remained after the test.

Figure 24:
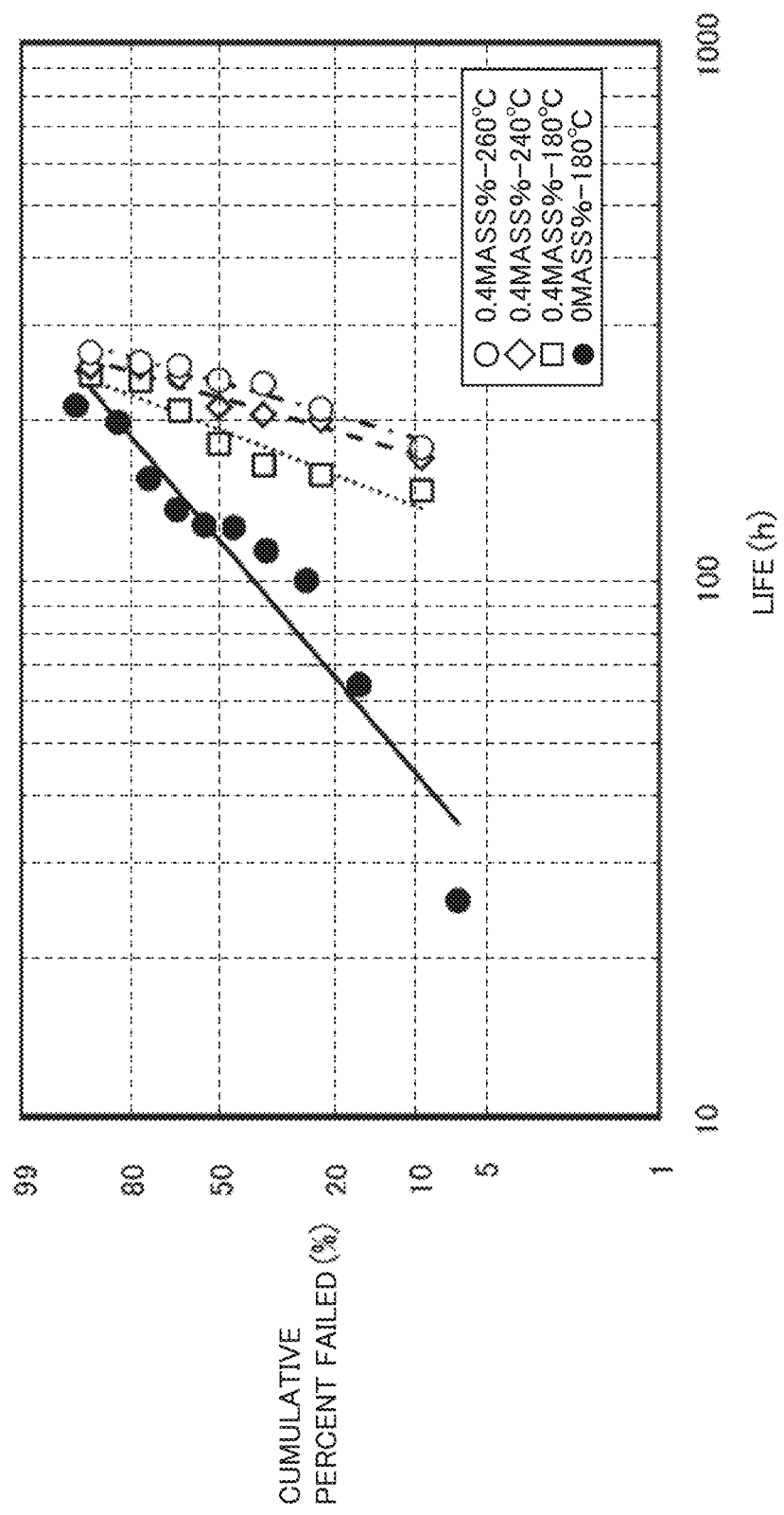
FIG. 24 is a diagram showing a Weibull plot of hydrogen-resistance life.

FIG. 24 and Table 2 show results of investigation of relation of a nitrogen concentration in a surface and a tempering temperature with hydrogen embrittlement flaking life. FIG. 24 shows a Weibull plot showing hydrogen-resistance life, in which the abscissa represents life (h) and the ordinate represents a cumulative percent failed (%). In FIG. 24, a nitrogen concentration and a tempering temperature are denoted as a "nitrogen concentration-tempering temperature" as in FIG. 22. Table 2 shows $L_{10}$ life (h), $L_{50}$ life (h), and a value for a Weibull slope for each heat treatment condition (nitrogen concentration-tempering temperature).

TABLE 2

| Condition for Heat Treatment | $L_{10}$ Life (h) | $L_{50}$ Life (h) | Weibull Slope |
|---|---|---|---|
| 0.4 Mass % - 260° C. | 185 | 235 | 7.86 |
| 0.4 Mass % - 240° C. | 173 | 220 | 7.73 |
| 0.4 Mass % - 180° C. | 138 | 192 | 5.74 |
| 0 Mass % - 180° C. | 44 | 120 | 1.89 |

As is clear from FIG. 24 and Table 2, in a case of 0 mass %-180° C., $L_{10}$ life was 44 h. In contrast, in a case of 0.4 mass %-180° C., $L_{10}$ life was 138 h (3.1 times), in a case of 0.4 mass %-240° C., $L_{10}$ life was 173 h (3.9 times), and in a case of 0.4 mass %-260° C., $L_{10}$ life was 185 h (4.2 times). Life was thus longer with increase in tempering temperature. This seems to be attributed to less likeliness of plastic deformation with increase in tempering temperature as described with reference to the results shown in FIG. 21. An action by hydrogen on plastic deformation has been known to be facilitation of dislocation motion, or stabilization and resultant multiplication of atomic vacancies generated as a result of dislocation interaction. Therefore, less likeliness of plastic deformation might have led to longer life.

Longest life was 212 h in a case of 0 mass %-180° C., 242 h in a case of 0.4 mass %-180° C., 251 h in a case of 0.4 mass %-240° C., and 266 h in a case of 0.4 mass %-260° C. Thus, there was not a great difference in longest life. In the case of 0 mass %-180° C., variation in life was great and consequently L10 life was short. In contrast, in any of the cases of 0.4 mass %-180° C., 0.4 mass %-240° C., and 0.4 mass %-260° C., it is considered that long life was achieved in a stable manner.

(4) Relation Between Tempering Temperature and Amount of Retained Austenite (γ)

Then, relation between a tempering temperature and an amount of retained austenite was investigated. Though a static load capacity or life of a bearing varies depending on a tempering temperature as described above, it is difficult to directly obtain a condition for a tempering temperature from a bearing in a state as a product. When a tempering temperature is constant, however, an amount of retained austenite at a position where a nitrogen concentration is 0.4 mass % and a tempering temperature correlate with each other, and hence a tempering temperature can be clarified indirectly based on the amount of retained austenite.

Figure 25:
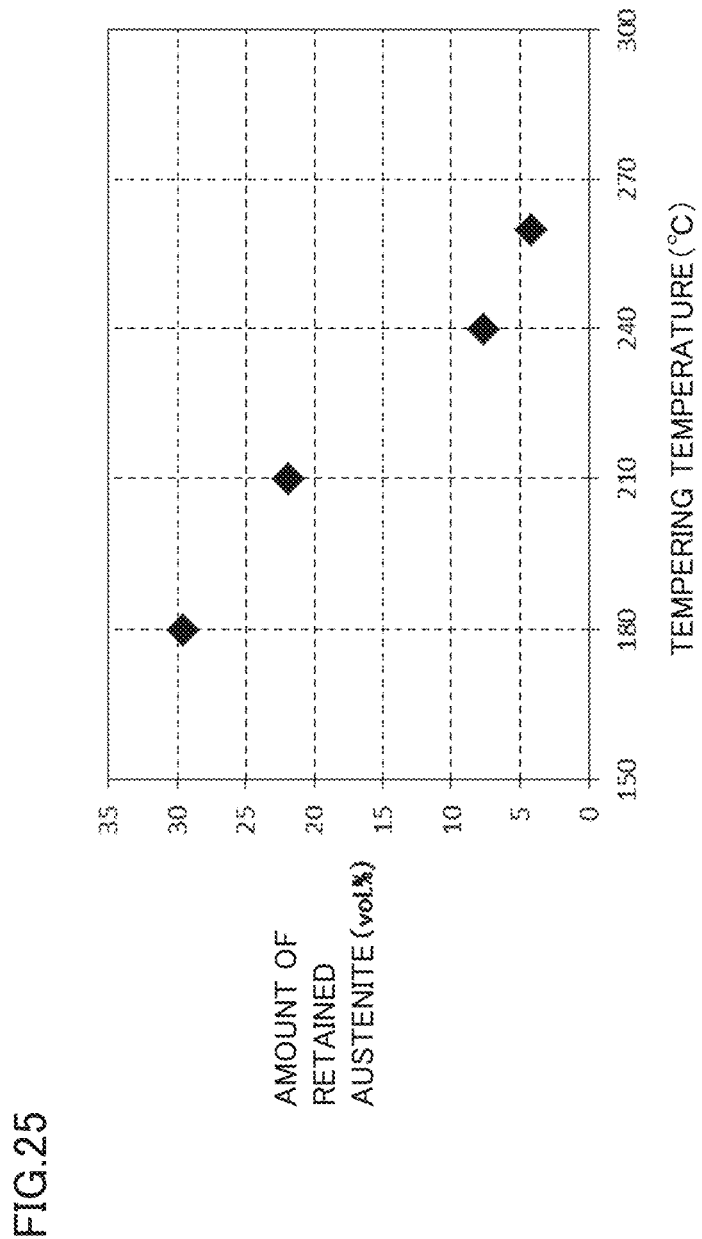
FIG. 25 is a diagram showing relation between a tempering temperature and an amount of retained austenite.

FIG. 25 shows relation between a tempering temperature and an amount of retained austenite. In FIG. 25, the abscissa represents a tempering temperature (° C.) and the ordinate represents an amount (volume %) of retained austenite at a position where a nitrogen concentration is 0.4 mass %. A retention time period in tempering treatment is constant at 2 h. As shown in FIG. 25, it was found that an amount of retained austenite was not greater than 8 volume % when a tempering temperature was 240° C. and the amount of retained austenite decreased to 5 volume % or smaller when a tempering temperature was 260° C.

(5) Relation Between Area Ratio of Precipitate in Inside and Tempering Temperature Then, relation between an area ratio of a precipitate in the inside and a tempering temperature was investigated. A method of measuring an area ratio of a precipitate other than an amount of retained austenite is available as a method of indirectly clarifying a tempering temperature based on a state as a product. This is because, when a heating temperature during quenching treatment (850° C. here, a crystal grain of prior austenite being Nos. 9 to 11 defined under JIS) and a retention time period during tempering treatment are constant, with increase in tempering temperature, carbon in a state of solid solution in a matrix precipitates and large cementite ($Fe_3C$) is formed.

Figure 26:
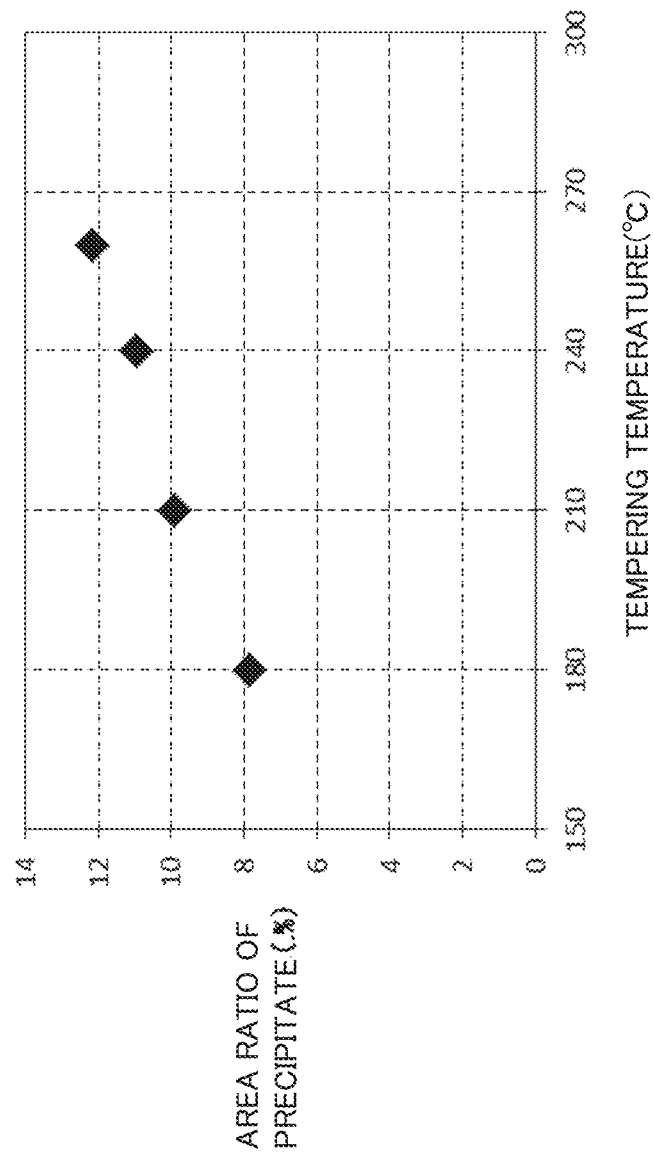
FIG. 26 is a diagram showing relation between a tempering temperature and an area ratio of a precipitate.
Figure 27:
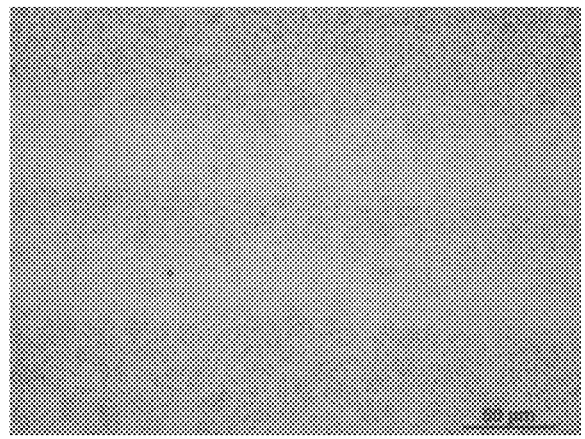
FIG. 27 shows a photograph of a precipitate when a tempering temperature is set to 180° C.
Figure 28:
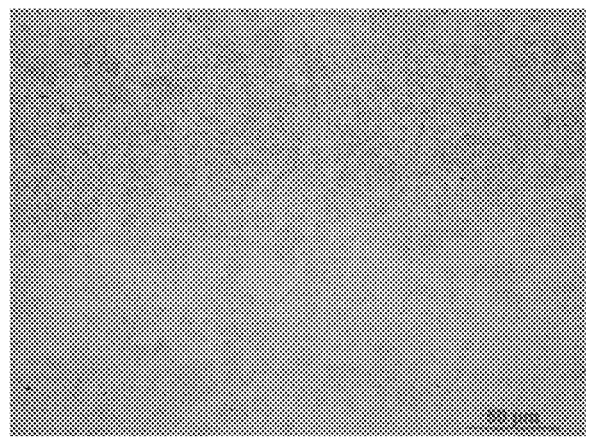
FIG. 28 shows a photograph of a precipitate when a tempering temperature is set to 210° C.
Figure 29:
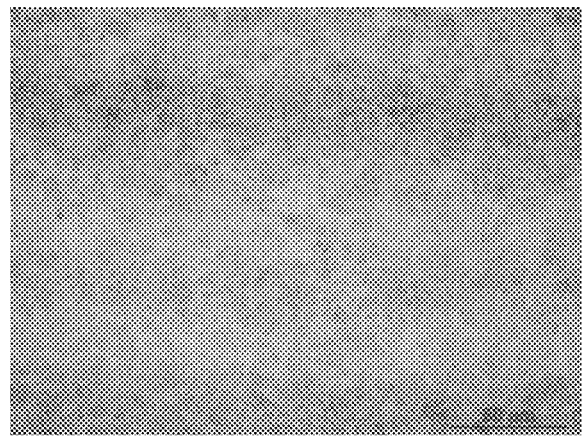
FIG. 29 shows a photograph of a precipitate when a tempering temperature is set to 240° C.
Figure 30:
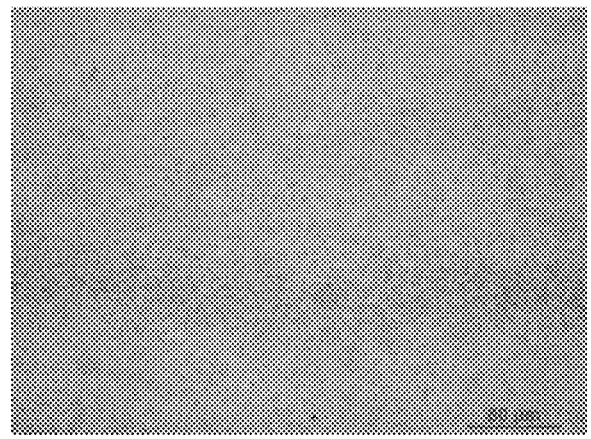
FIG. 30 shows a photograph of a precipitate when a tempering temperature is set to 260° C.
Figure 31:
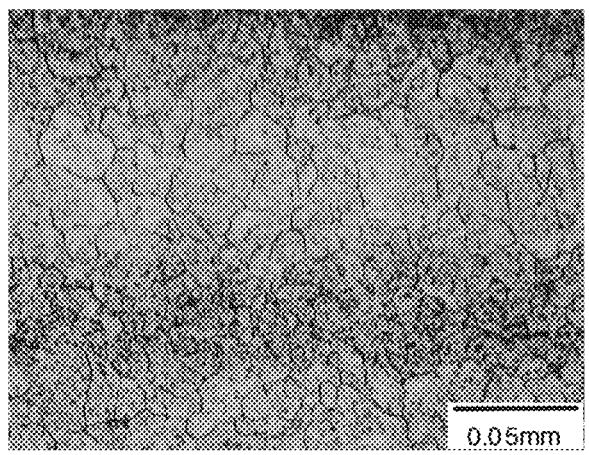
FIG. 31 shows a photograph of crystal grains of prior austenite in an unnitrided region.

FIG. 26 shows a result of investigation of relation between an area ratio of a precipitate in an unnitrided region in the inside and a tempering temperature. In FIG. 26, the abscissa represents a tempering temperature (° C.) and the ordinate represents an area ratio (%) of a precipitate. A retention time period in the tempering treatment was set to be constant at 2 hours. FIGS. 27 to 30 show photographs of cross-sections of steel products in cases that a tempering temperature was set to 180° C., 210° C., 240° C., and 260° C., respectively, in which a precipitate in the steel product is seen as a black portion. FIG. 26 shows relation of a calculated area ratio of a precipitate which is seen as a black portion in the photographs in FIGS. 27 to 30 with a tempering temperature. FIG. 31 shows a photograph of a crystal grain of prior austenite (not smaller than No. 9 and not greater than No. 11 defined under JIS) in an unnitrided region in the inside with a heating temperature during the quenching treatment being set to 850° C.

It was found from FIG. 26 that an area ratio was not lower than 11% when a tempering temperature was set to 240° C. and the area ratio increased to 12% or higher when the tempering temperature was set to 260° C. The reason why determination of an area ratio of a precipitate is made in an internal unnitrided region is that terminal solid solubility of carbon has been varied in a nitrided surface portion and hence an area ratio of the precipitate greatly fluctuates. Though the area ratio fluctuates also owing to a temperature for carbonitriding treatment or a heating temperature for quenching, the area ratio can be estimated based on an average particle size of the crystal grain of prior austenite. As shown in FIG. 31, a grain size number of the crystal grain of prior austenite in the unnitrided region at the time when a heating temperature was set to 850° C. was No. 9.5. As a result of the discussions in (1) to (5) above, it was found that a bearing component which was inexpensive and had improved yield strength and life could be obtained by subjecting a steel product within the range of components to carbonitriding treatment and quenching treatment as well as to tempering treatment at a nitrogen concentration in the surface (a raceway surface or a rolling contact surface) of 0.4 mass % or higher and at a temperature not lower than 240° C.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The bearing component and the rolling bearing according to the present invention can particularly advantageously be applied to a bearing component and a rolling bearing required to be inexpensive and have improved yield strength and life.

REFERENCE SIGNS LIST

1 deep-groove ball bearing; 2 tapered roller bearing; 11, 21 outer ring; 11A, 21A outer ring raceway surface; 11B, 12B, 22B non-ground surface; 12, 22 inner ring; 12A, 22A inner ring raceway surface; 13 ball; 13A, 23A rolling contact surface; 14, 24 cage; 23 roller; 30 atmosphere control step; 31 undecomposed $NH_3$ partial pressure control step; 32 $H_2$ partial pressure control step; 33 $CO/CO_2$ partial pressure control step; and 40 heating pattern control step.

The invention claimed is:

1. A bearing component, composed of steel which contains carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and is composed of remainder iron and an impurity and having a carbonitrided layer formed at a surface portion including a contact surface which is a surface in contact with other components, an average concentration of nitrogen in said surface portion being not lower than 0.3 mass % and not higher than 0.6 mass % and variation in nitrogen concentration in said surface portion being not higher than 0.1 mass %, an amount of retained austenite in said surface portion being not greater than 8 volume %, an area ratio of a precipitate in inside where no said carbonitrided layer is formed being not lower than 11% and the surface portion being a region extending from the contact surface to a depth of not more than 20 μm in a direction of thickness of the bearing component.

2. The bearing component according to claim 1, wherein said amount of retained austenite is not greater than 5 volume %.

3. The bearing component according to claim 1, wherein the area ratio of said precipitate is not lower than 12%.

4. The bearing component according to claim 1, wherein an inclination of nitrogen concentration in a direction of thickness of said bearing component is not less than −15 (1/m).

5. The bearing component according to claim 1, wherein said surface portion includes five or more carbonitrides per 100 μm², the carbonitrides each having a diameter not greater than 0.5 μm.

6. The bearing component according to claim 1, wherein the nitrogen concentration in a non-ground portion including a non-ground surface which is a surface other than said contact surface is lower than 0.7 mass %.

7. The bearing component according to claim 1, wherein after heat treatment in which a heating temperature is set to 500° C. and a retention time period is set to 1 hour, a Vickers hardness at a position at a depth of 0.4 (mm) from said contact surface is higher by at least 80 HV than a Vickers hardness in a region where no said carbonitrided layer is formed in a direction of thickness of said bearing component.

8. The bearing component according to claim 1, wherein crystal grains of prior austenite in the inside where no said carbonitrided layer is formed have a grain size number not smaller than No. 9 and not greater than No. 11 defined under JIS.

9. A rolling bearing, comprising the bearing component according to claim 1.

* * * * *